United States Patent
Bergmann et al.

(10) Patent No.: US 10,866,494 B1
(45) Date of Patent: *Dec. 15, 2020

(54) CAMERA POLE

(71) Applicants: Brian Bergmann, Saratoga Springs, UT (US); Branden Reall, Eagle Mountain, UT (US)

(72) Inventors: Brian Bergmann, Saratoga Springs, UT (US); Branden Reall, Eagle Mountain, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 16/266,006

(22) Filed: Feb. 2, 2019

Related U.S. Application Data

(63) Continuation-in-part of application No. 15/853,733, filed on Dec. 23, 2017, now Pat. No. 10,248,009, which is a continuation-in-part of application No. 14/967,273, filed on Dec. 12, 2015, now Pat. No. 10,146,106.

(60) Provisional application No. 62/439,120, filed on Dec. 26, 2016, provisional application No. 62/091,539, filed on Dec. 14, 2014.

(51) Int. Cl.
*G03B 17/56* (2006.01)
*F16M 11/26* (2006.01)
*F16M 11/20* (2006.01)
*F16M 11/18* (2006.01)
*F16M 11/10* (2006.01)
*F16M 11/36* (2006.01)

(52) U.S. Cl.
CPC .......... *G03B 17/561* (2013.01); *F16M 11/10* (2013.01); *F16M 11/18* (2013.01); *F16M 11/2014* (2013.01); *F16M 11/26* (2013.01); *F16M 11/36* (2013.01)

(58) Field of Classification Search
CPC .... G03B 17/561; Y10T 24/3913; F16M 11/10
See application file for complete search history.

(56) References Cited

U.S. PATENT DOCUMENTS 6,932,305 B2 * 8/2005 Morales ................. F16M 11/10
                                                              248/125.2
10,248,009 B1 * 4/2019 Bergmann ............. F16M 11/26

* cited by examiner

*Primary Examiner* — Noam Reisner
(74) *Attorney, Agent, or Firm* — John J. Elnitski, Jr.

(57) ABSTRACT

A camera pole for elevating and controlling a camera. A pole having a base section and a least one telescoping section which extends from the base section. Where a final telescoping section is a top section that is highest and the base section is closest to ground level. A stand to receive the pole and support the pole. A camera control assembly comprising an camera mount, tension cable and handle assembly that can be adjusted for any pole height.

20 Claims, 41 Drawing Sheets

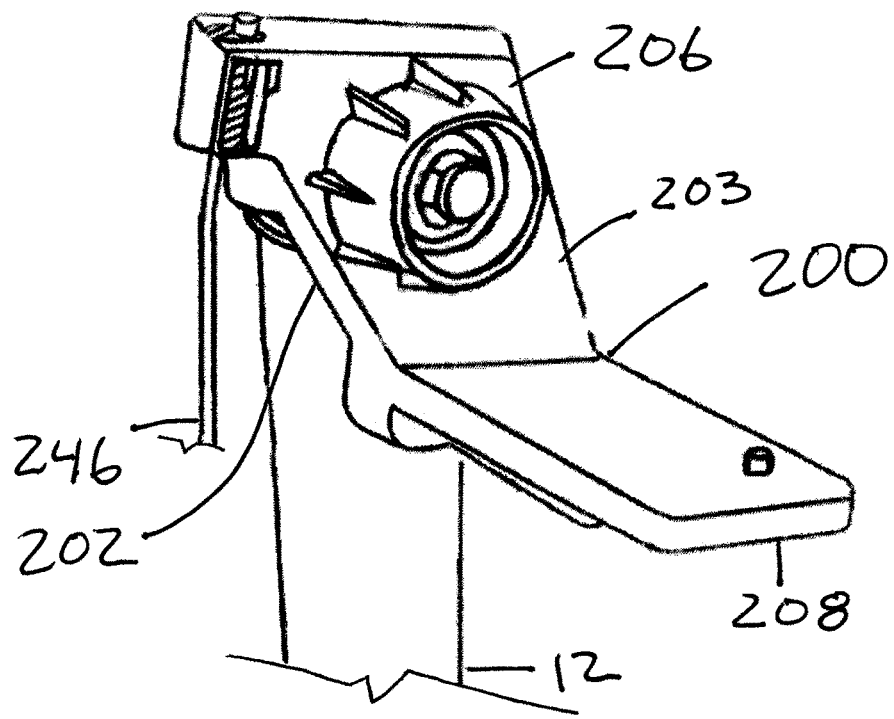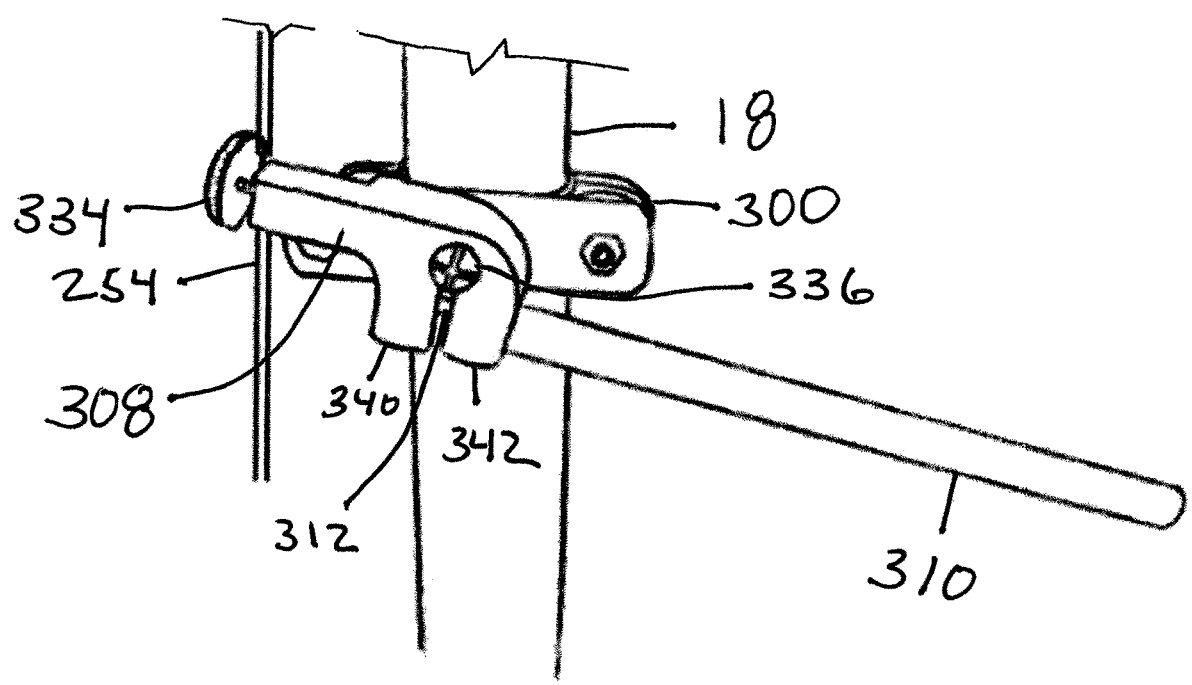
Fig. 36

CAMERA POLE

This application is a Continuation In Part of U.S. application Ser. No. 15/853,733 and claims the benefit of and incorporates by reference U.S. application Ser. No. 15/853,733 filed Dec. 23, 2017; U.S. application Ser. No. 14/967,273 filed Dec. 12, 2015; U.S. Provisional Application No. 62/439,120, filed Dec. 26, 2016 and U.S. Provisional Application No. 62/091,539, filed Dec. 14, 2014.

BACKGROUND

The present invention generally relates to the production of elevating cameras to film at a higher angle. More specifically, the present invention relates to camera poles for elevating a camera to a height in the range of 10 to 40 feet in the air and controlling a camera.

Filming of players in team sports such as football and soccer have become more prevalent for the high school age players and younger. It allows for an aid for coaching, as well as for parents to record their child's play at games and practices. A majority of the time, filming cannot be performed at the height necessary due to the lack of a stadium. Many playing fields during practice and games are view from ground level. There are camera poles on the market, but the expense of the available camera pole is in the thousands of dollars, which cannot be afforded by smaller sports programs or individual parents. What is needed is a simplified product that can elevate and control a camera, yet break the high cost barrier imposed by current units.

It is an object of the present invention to provide a simplified camera pole for elevating a camera to film from a higher angle.

SUMMARY

A camera pole for elevating and controlling a camera. A pole having a base section and a least one telescoping section which extends from the base section. Where a final telescoping section is a top section that is highest and the base section is closest to ground level. A stand to receive the pole and support the pole. A camera control assembly comprising an camera mount, tension cable and handle assembly that can be adjusted for any pole height.

BRIEF DESCRIPTION OF DRAWINGS

FIG. 36 is a perspective view of a camera mount and handle assembly according to the present invention.

DETAILED DESCRIPTION OF THE INVENTION

Figure 1:
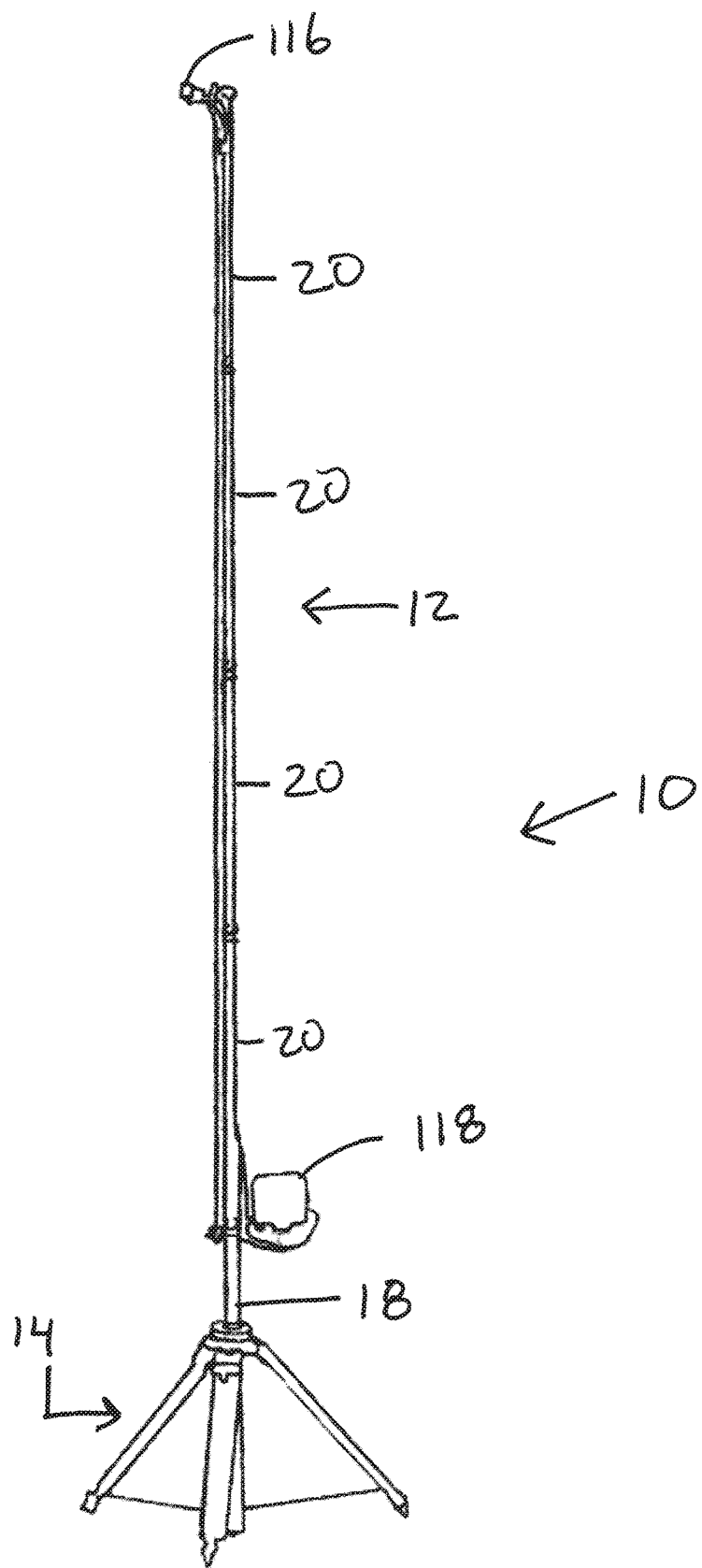
FIG. 1 is a perspective view of a camera pole assembly according to the present invention.

The present invention is a camera pole assembly for elevating a camera to a height in the range of 10 to 40 feet in the air and controlling a camera. FIG. 1 shows the assembled camera pole assembly 10 deployed. The camera pole assembly includes a pole 12, stand 14, camera control assembly and camera mount 16.

Figure 2:
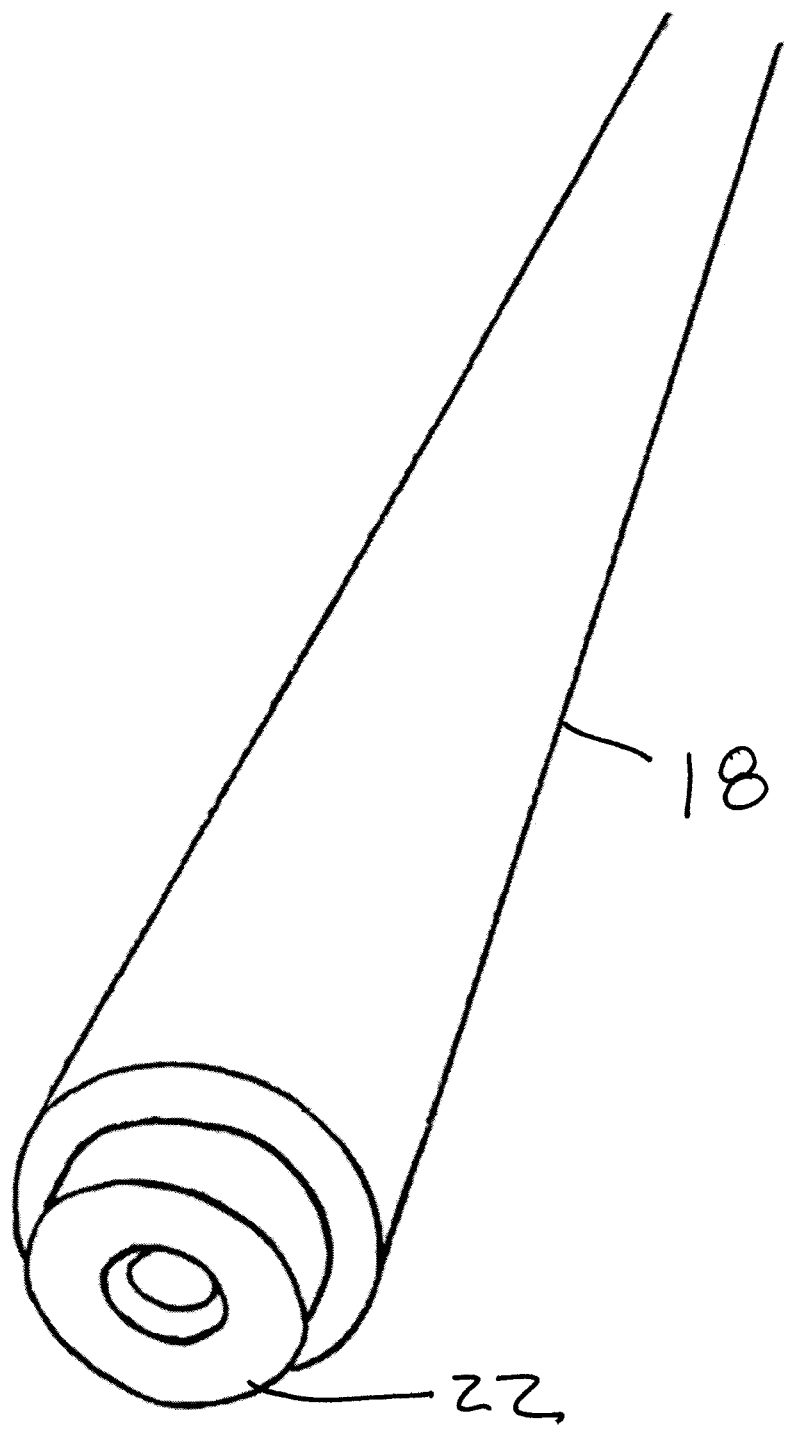
FIG. 2 is a perspective view of a base section according to the present invention.
Figure 3:
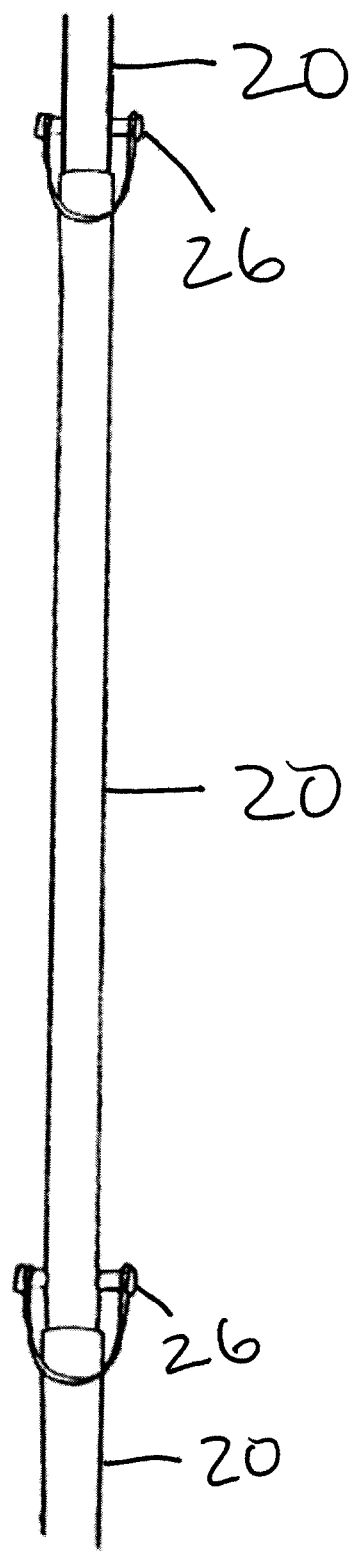
FIG. 3 is a perspective view of a pole according to the present invention.
Figure 4:
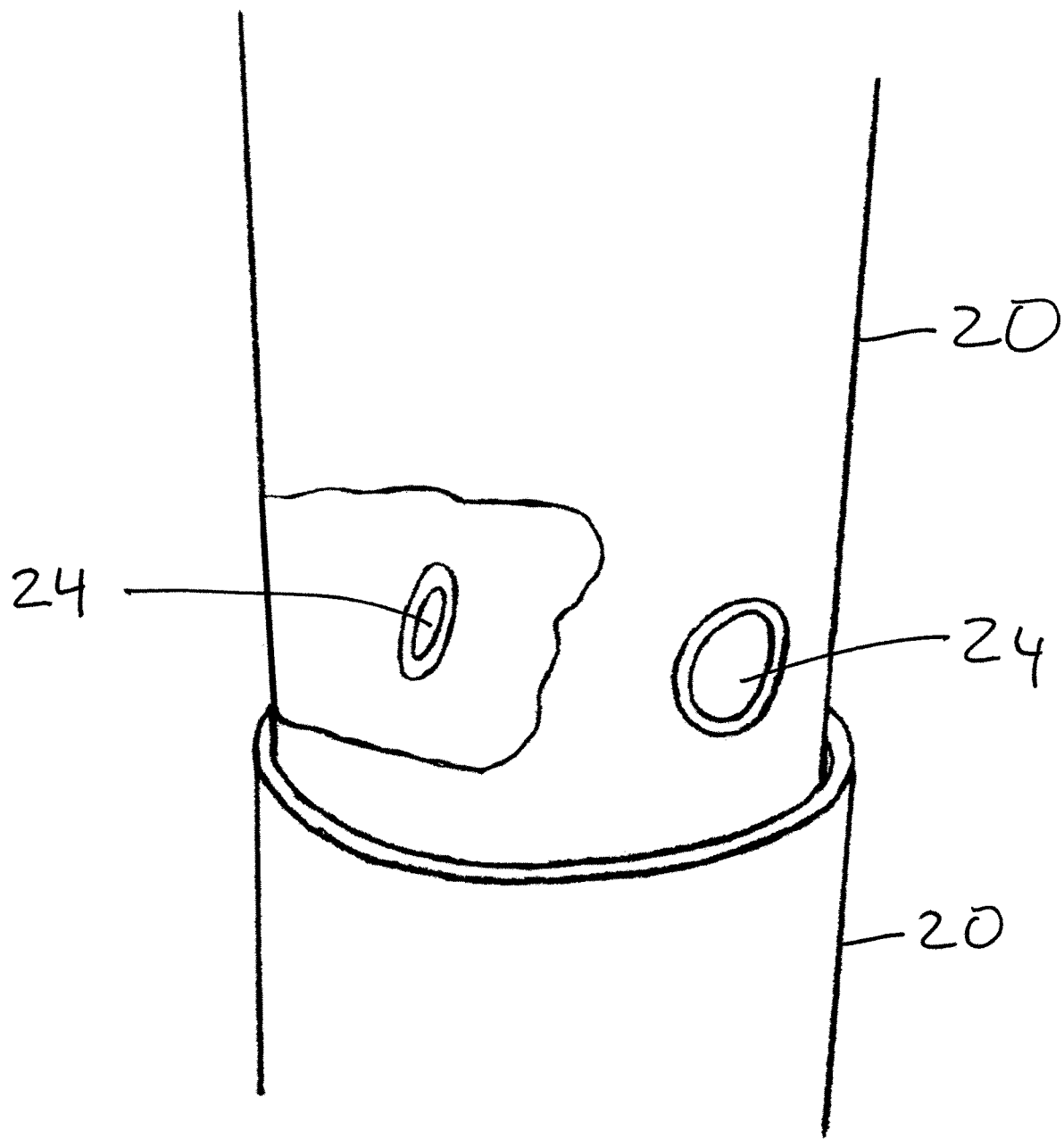
FIG. 4 is a perspective view of a pole according to the present invention.
Figure 5:
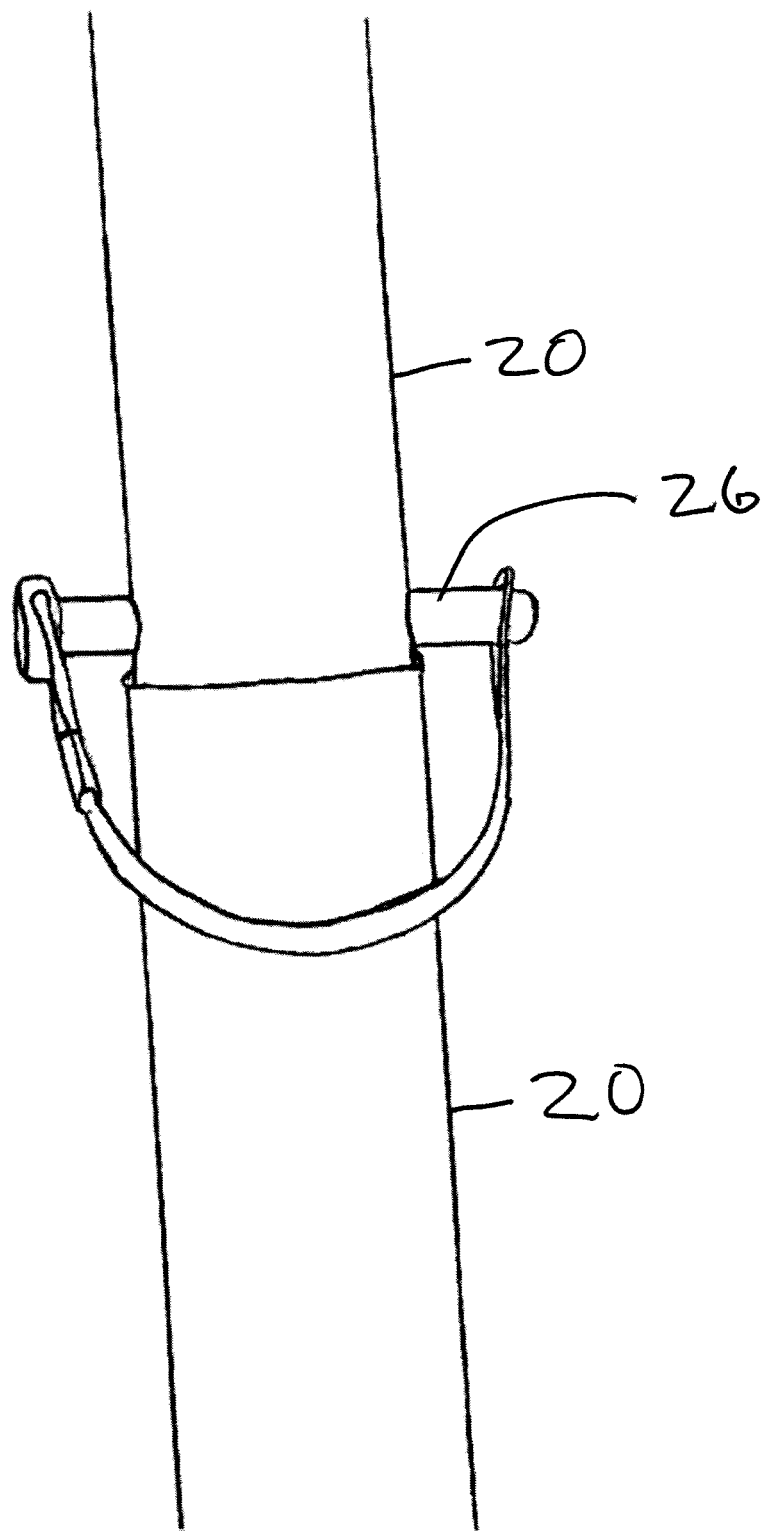
FIG. 5 is a perspective view of a pole according to the present invention.

The pole 12 includes a base section 18 with telescoping sections 20 contained in the base section 18, as shown in FIG. 1. On a ground end of the base section 18 is a support end 22 attached to the ground end 18 of the base section 18, as shown in FIG. 2. The support end 22 is rotatably attached to the ground end such that when the base section 18 is placed against the ground, the support end 22 supports the base section 18 from the ground and allows the base section 18 to rotate about the support end 22. Each telescoping section 20 of a smaller diameter fits into a lower telescoping section 20 of a larger diameter, as shown in FIG. 3. Each telescoping section 20 is tapered larger in diameter at a lower end to smaller in diameter at an upper end, so as each telescoping section 20 tightens against the telescoping section 20 it is within as it is extended upward. Each telescoping section 20 includes aligned pin holes 24 near the lower end to receive a pin 26, as shown in FIG. 4. As shown in FIG. 5, the pin 26 is used to prevent each telescoping section 20 from falling downward once extended.

Figure 6:
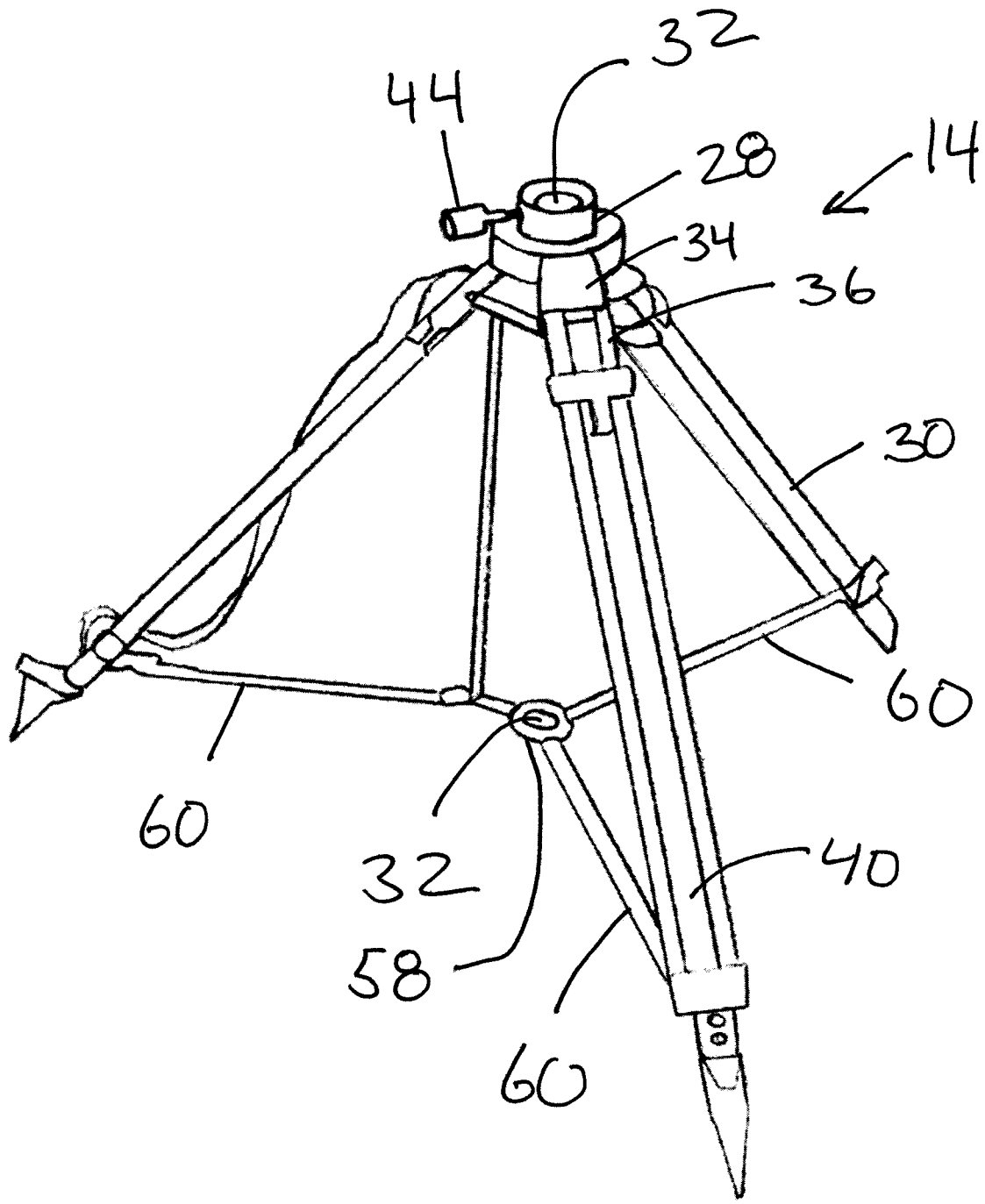
FIG. 6 is a perspective view of a stand according to the present invention.
Figure 7:
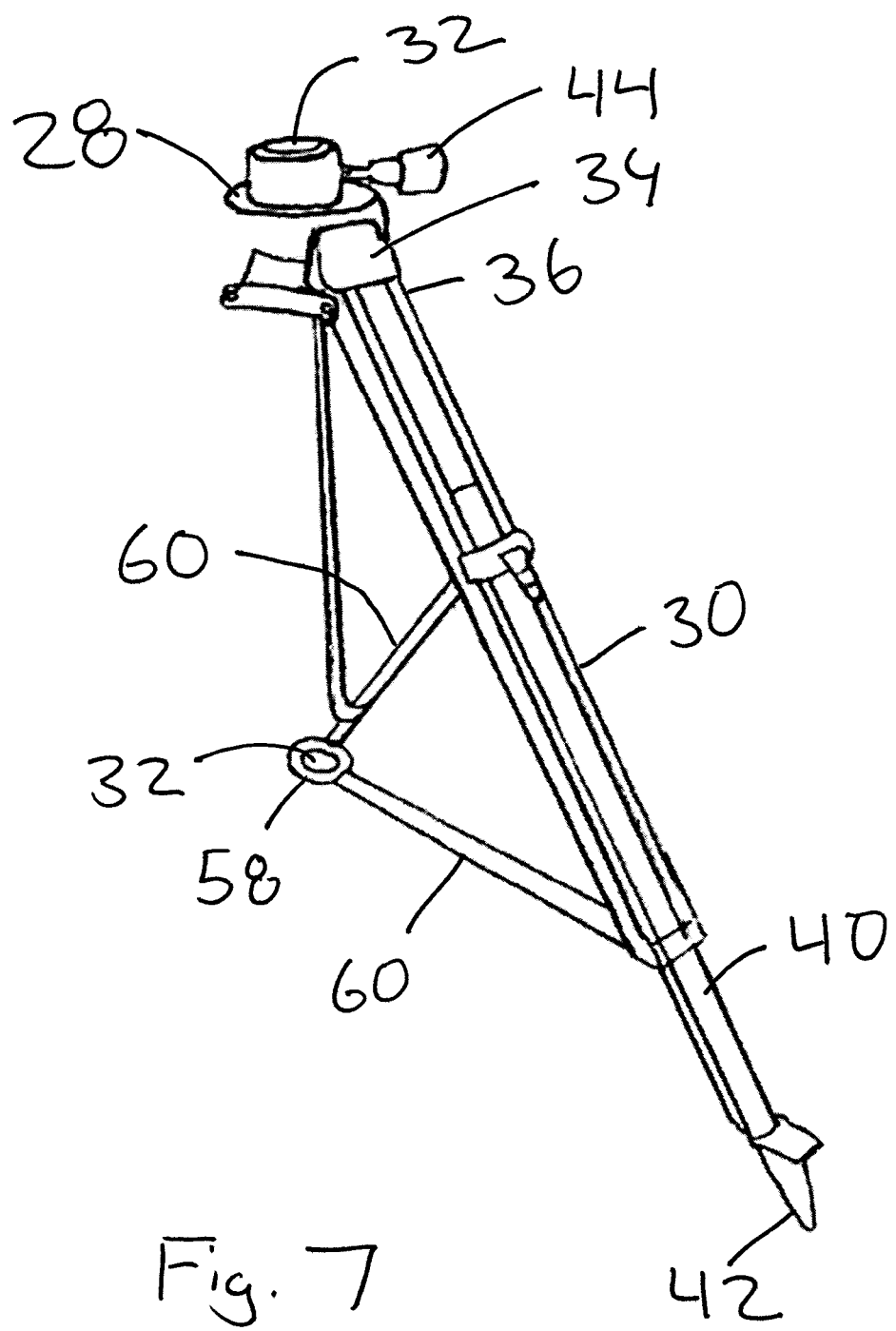
FIG. 7 is a perspective view of a stand according to the present invention.

The stand 14 is shown as a tripod in FIGS. 1 and 6-7. The tripod includes a head 28, adjustable legs 30 and pole stabilizer. The head 28 includes a pole opening 32 and three leg mounts 34. The leg mounts 34 accept a mount end 36 of each leg 30. Each first end of the legs 30 mounts to the head 28 using fasteners to allow the leg 30 to rotate about the mount point of each leg 30 to the head 28. The legs 30 can be rotated out to use the stand 14 as shown or rotated inward toward each other to fold up the stand 14. The legs 30 adjust in length buy releasing a leg lock 38 and moving a center section 40 of the leg 30 outward to desired length, then engaging the leg lock 38 to lock center section 40 in place, as shown in FIG. 7. The center section 40 of each leg 30 includes a pointed end 42 to allow for the pointed end 42 to be embedded into the ground.

Figure 8:
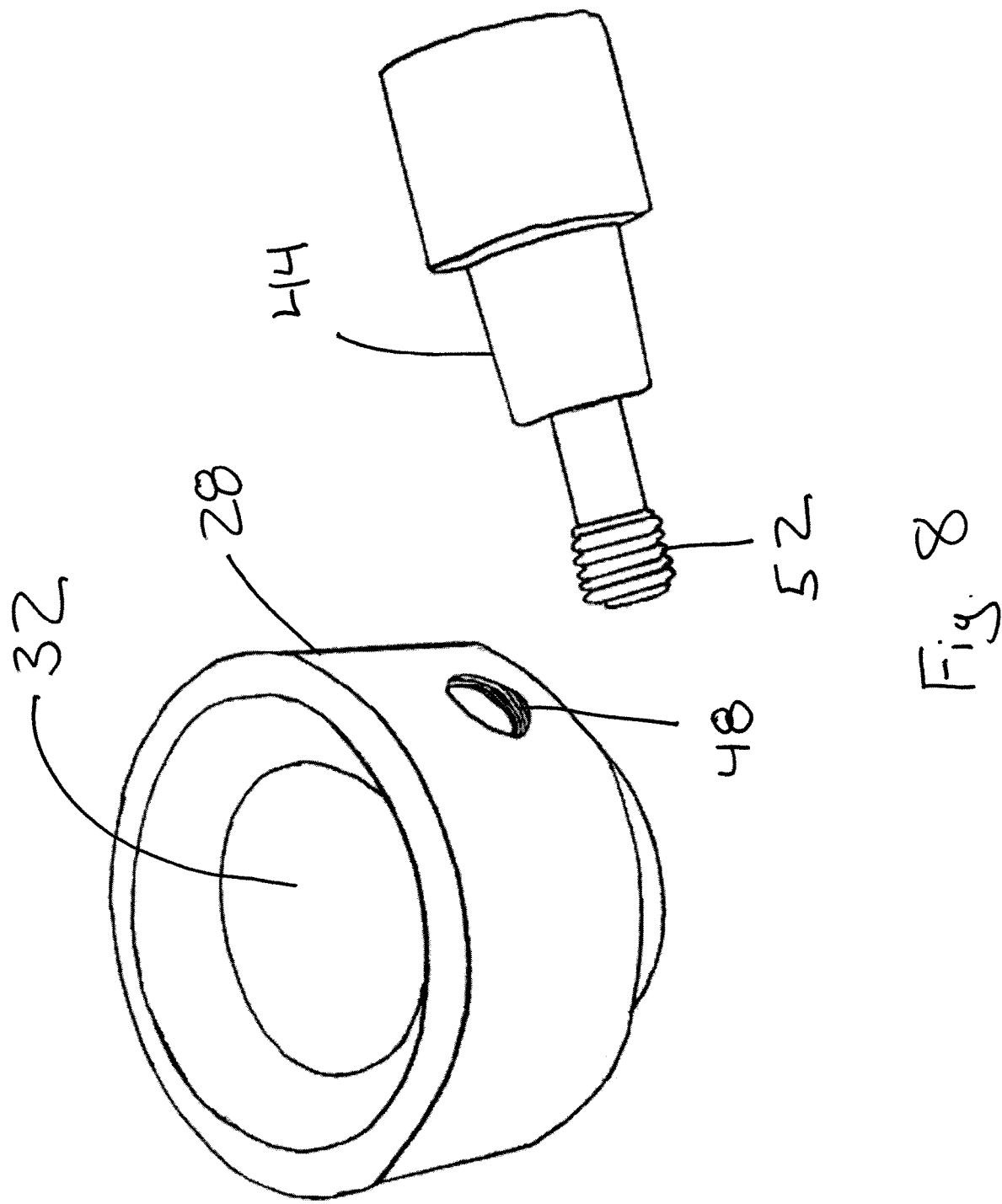
FIG. 8 is a perspective view of a head according to the present invention.
Figure 9:
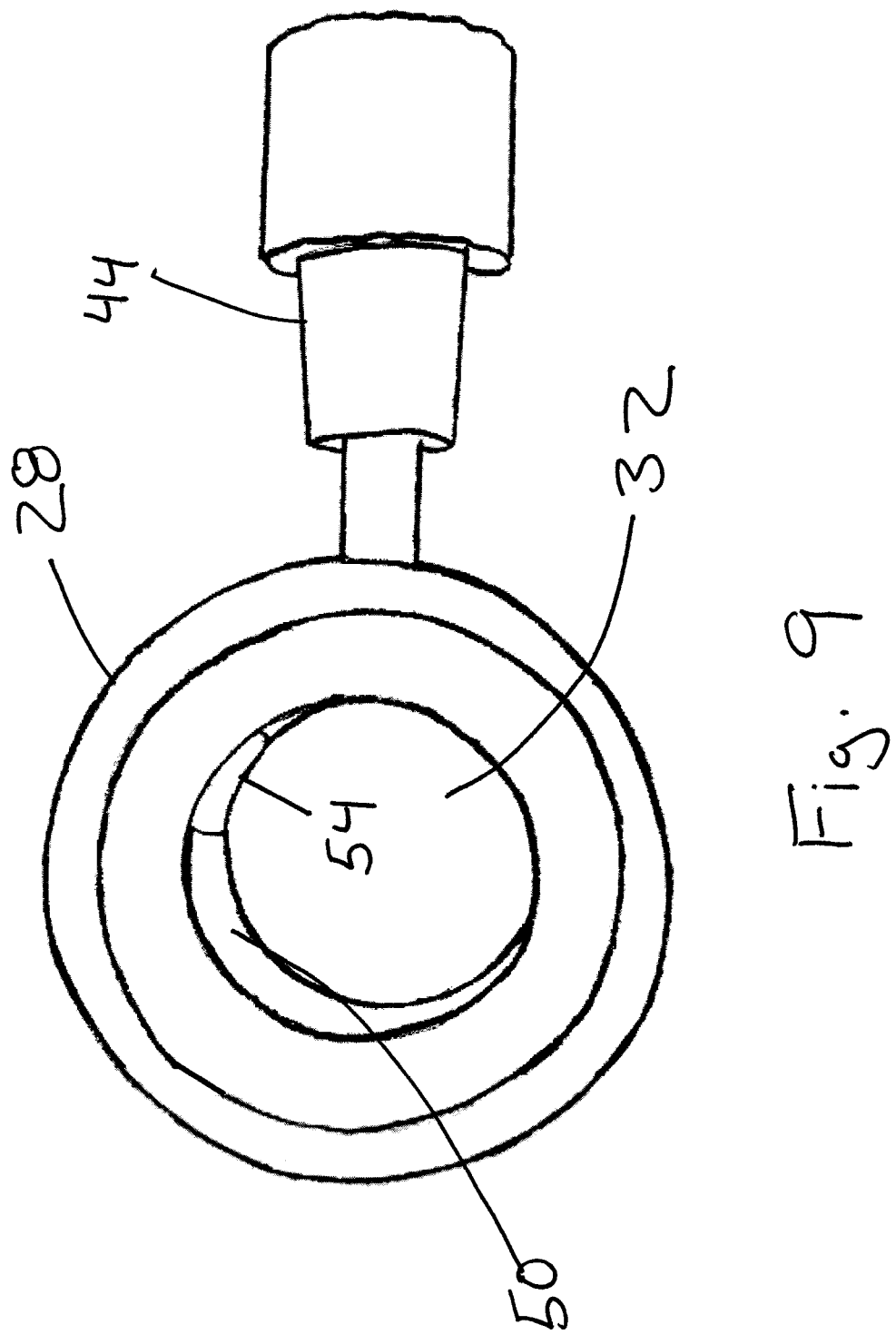
FIG. 9 is a perspective view of a head according to the present invention.
Figure 10:
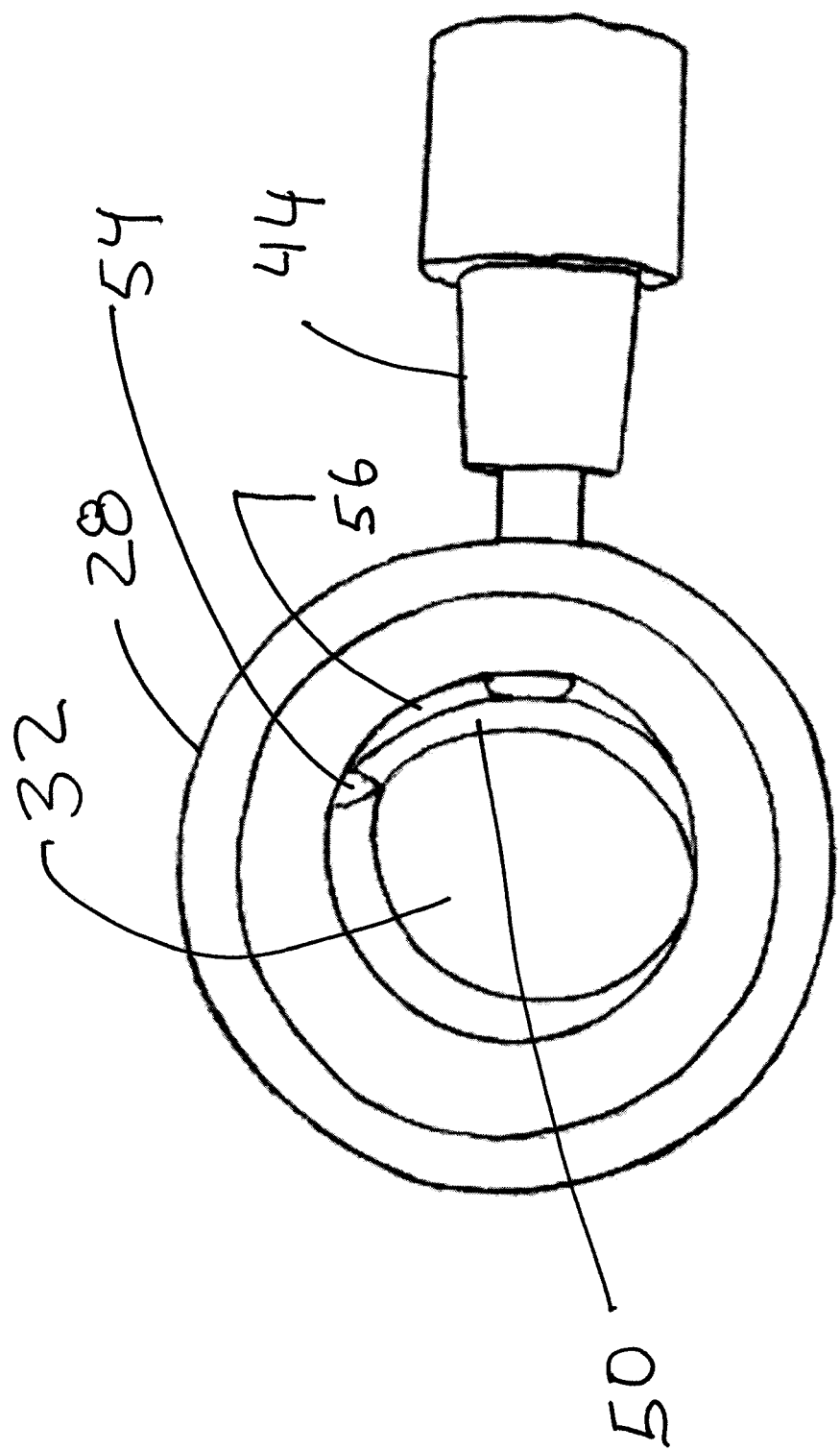
FIG. 10 is a perspective view of a head according to the present invention.
Figure 11:
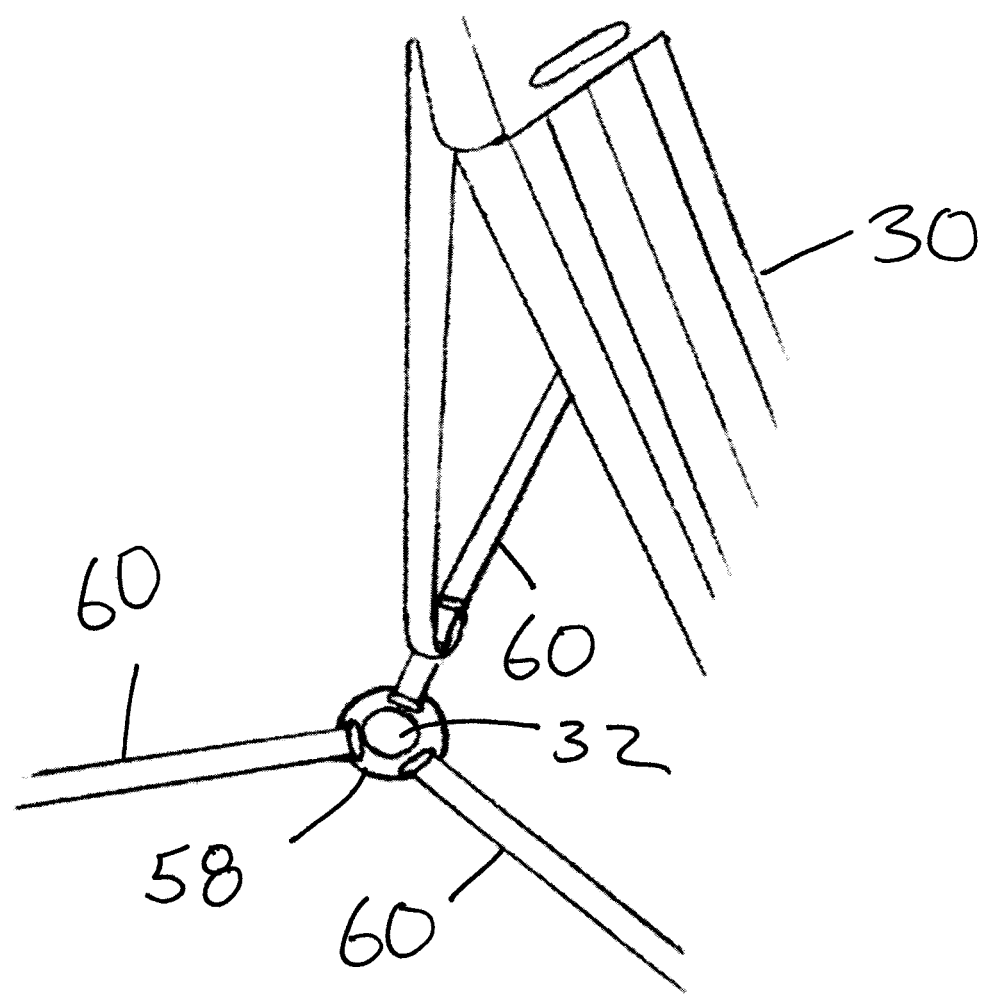
FIG. 11 is a perspective view of a pole stabilizer according to the present invention.
Figure 12:
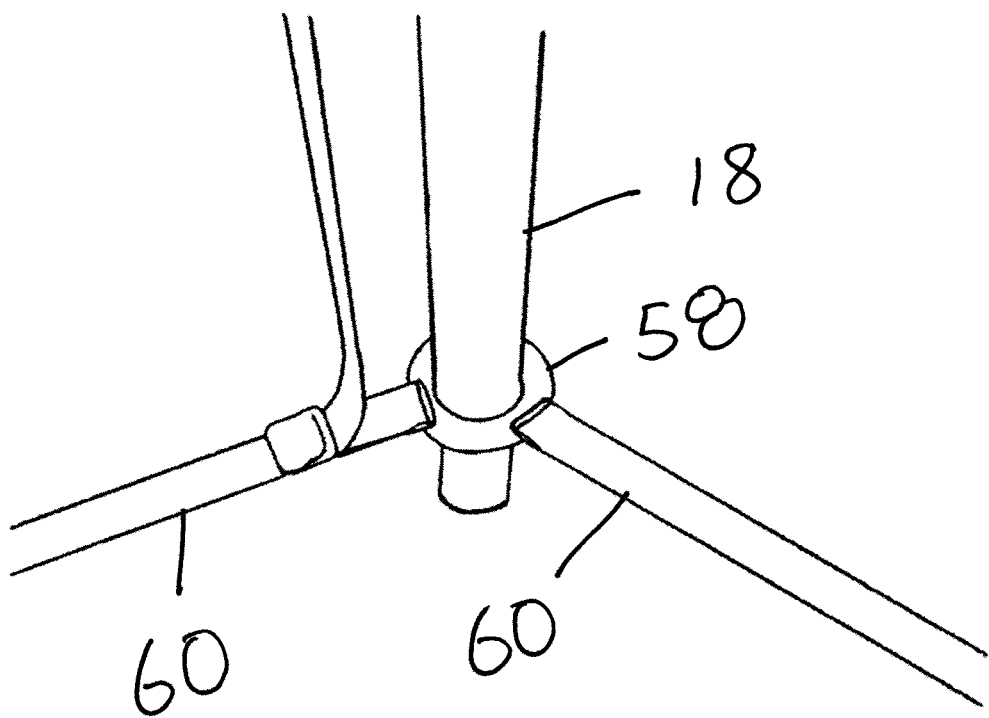
FIG. 12 is a perspective view of a pole stabilizer according to the present invention.

The head 28 includes a compression lock assembly internally about the pole opening 32, as shown in FIGS. 8-10. The compression lock assembly includes a handle 44, screw hole 48 in the head 28 and compression ring 50, as shown in FIG. 8. The handle 44 has a threaded end 52 to screw into threads in the screw hole 48. The screw hole 48 leads to the pole opening 32 in the head 28. The compression ring 50 is a split ring at a split 54 shown in FIGS. 9-10. One end 56 of the split ring is positioned near the screw hole 48. The base section 18 of the pole 12 is placed into the pole opening 32 until the support end 22 of the base section 18 touches the ground. After the pole 12 is inserted into the pole opening 32, the handle 44 is screw inward so that the threaded end 52 pushes the split ring outward, as shown in FIG. 10 without the pole 12. The split ring applies pressure against the base section 18 and holds the base section 18 in place. Applying the right amount of pressure allows the base section 18 to be held in place, yet the base section 18 can be rotated within the pole opening 32 with enough pressure by the user on the base section 18. The pole stabilizer includes a pole ring 58 with straps 60, as shown in FIGS. 6-7 and 11-12. Each strap 60 is connected between the pole ring 58 and one of the legs 30. The pole ring 58 includes a pole opening 32 to receive the base section 18 of the pole 12 after the base section 18 is inserted into the pole opening 32 of the head 28. The pole stabilizer is a second point to hold the pole 12 in a vertical position, when the legs 30 are spread and the straps 60 pull against the pole ring 58.

Figure 13:
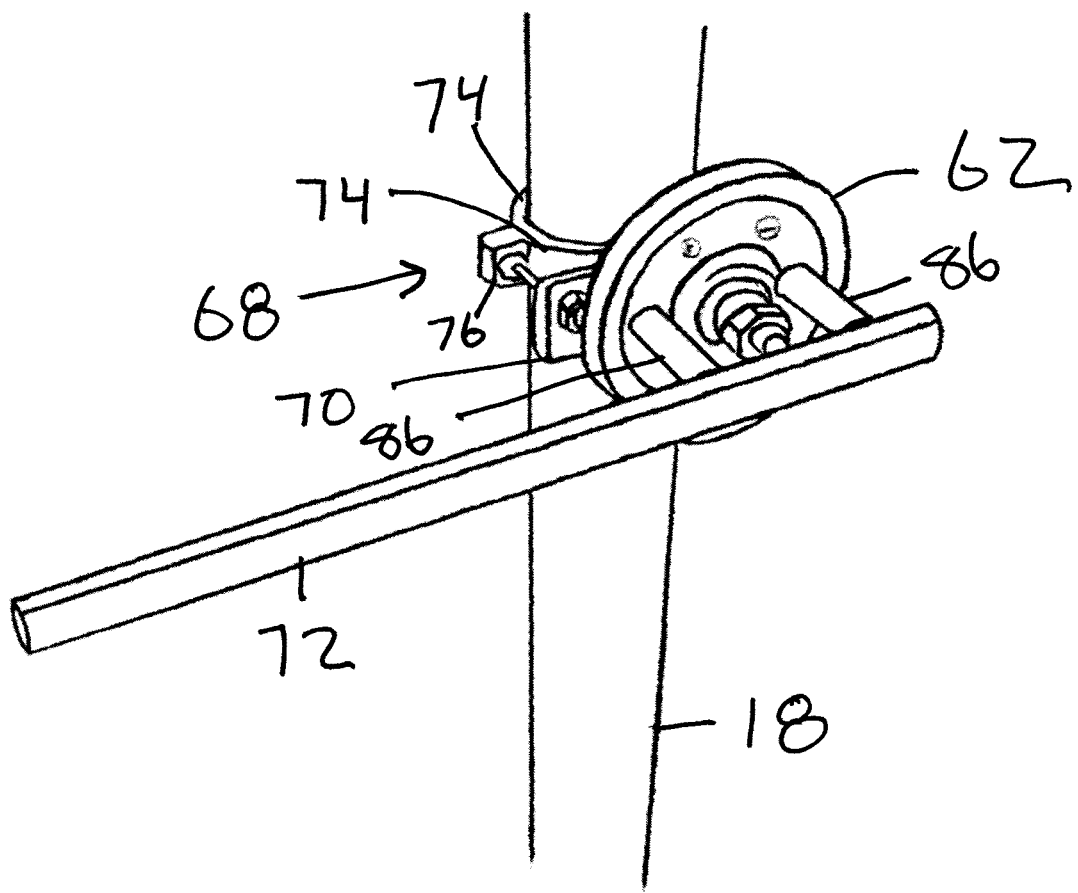
FIG. 13 is a perspective view of a lower pulley according to the present invention.
Figure 14:
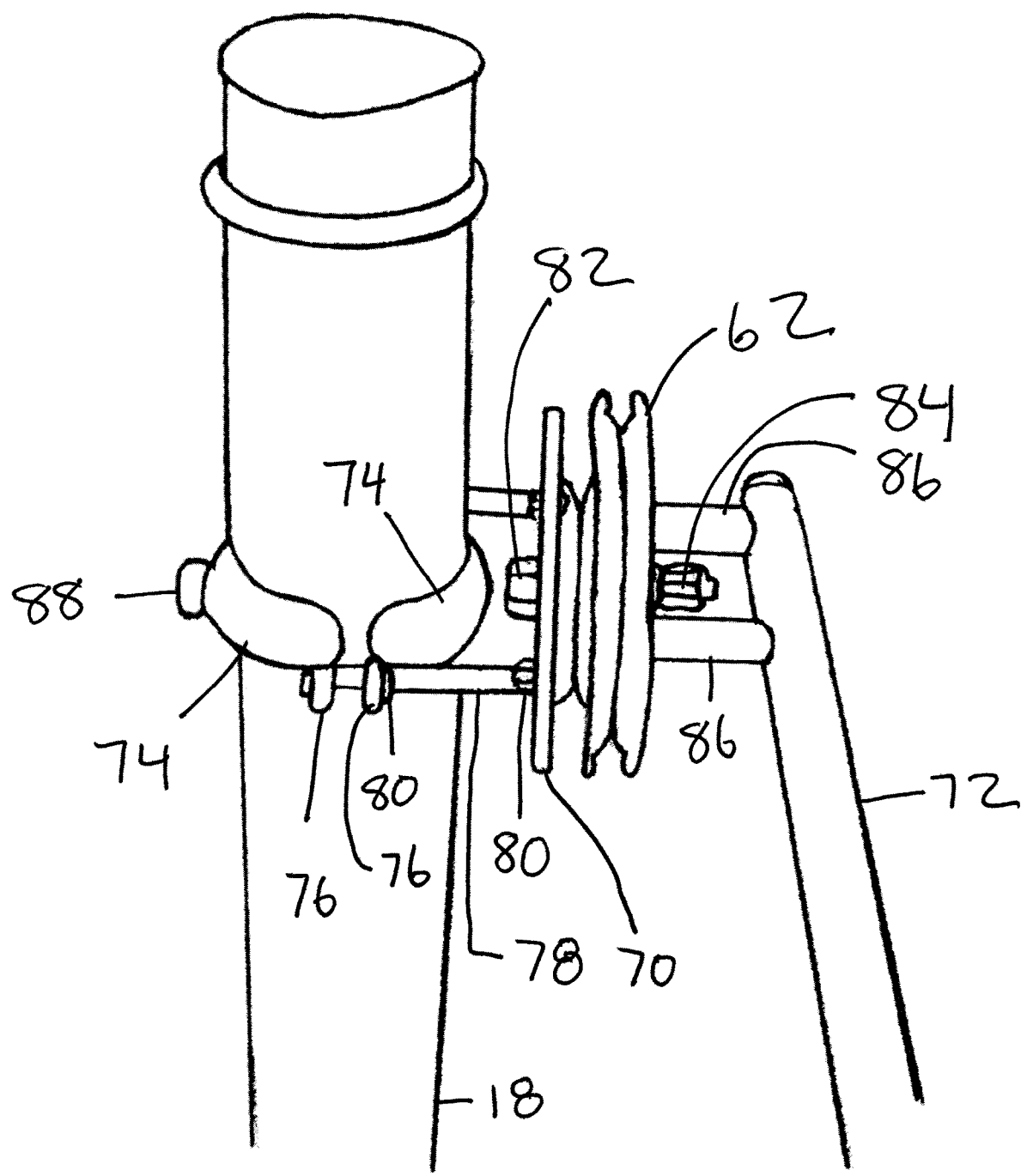
FIG. 14 is a perspective view of a lower pulley according to the present invention.
Figure 15:
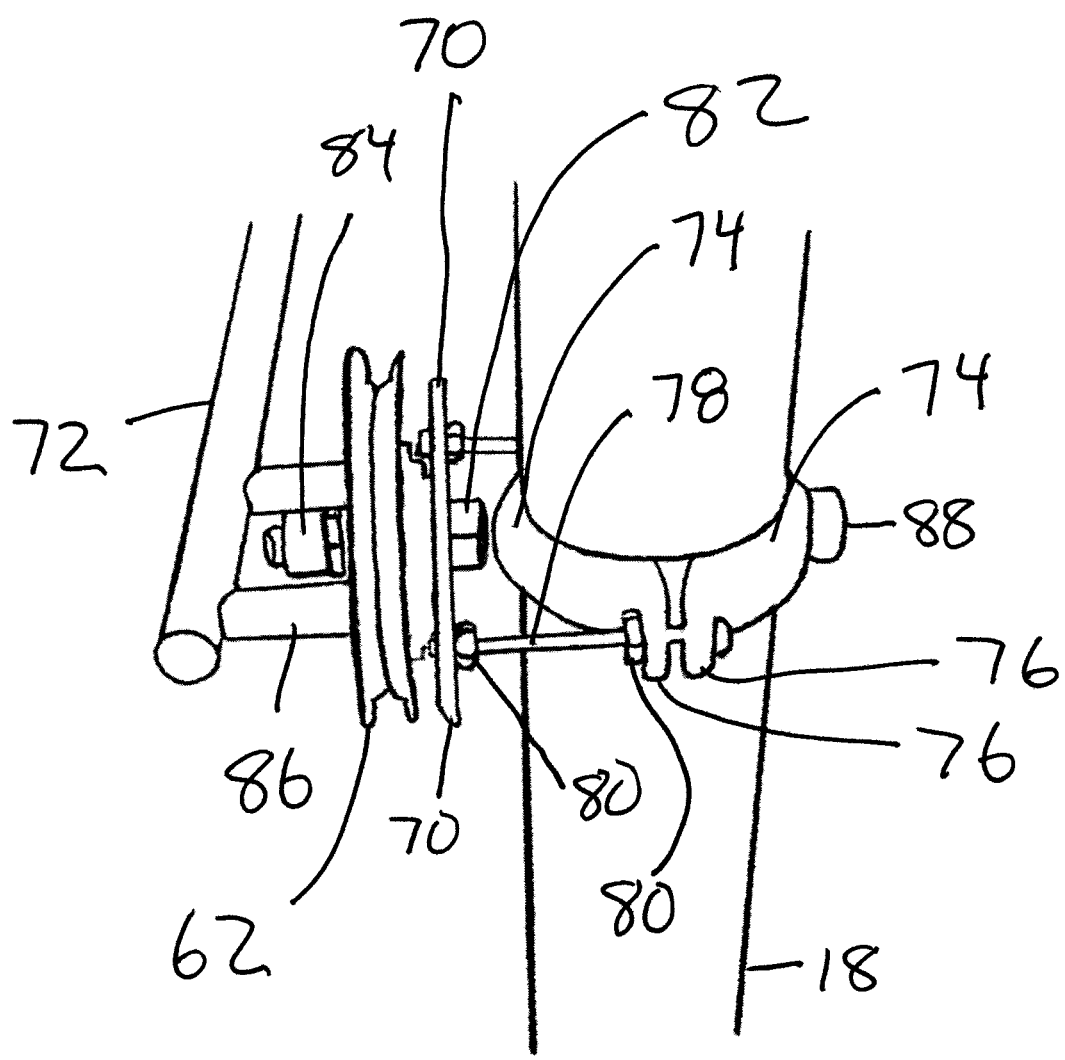
FIG. 15 is a perspective view of a lower pulley according to the present invention.
Figure 16:
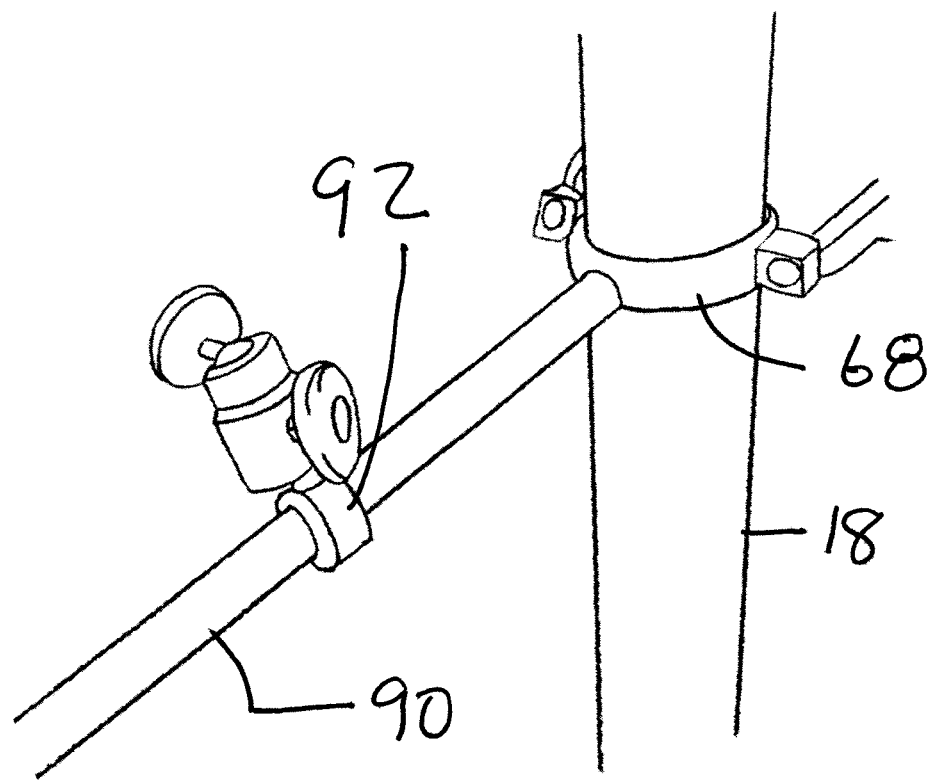
FIG. 16 is a perspective view of a monitor shaft according to the present invention.

The camera control assembly includes a lower pulley 62, lower pulley attachment assembly, upper pulley 64, upper pulley attachment assembly and an adjustable cable 66. The lower pulley assembly includes a collar 68, lower pulley plate 70 and handle 72, as shown in FIGS. 13-15. The collar 68 includes two half circular clamp halves 74 which clamp around the base section 18 of the pole 12. Each clamp half 74 includes two ends 76 with bolt holes. Two bolts 78 are used to fasten the clamp halves 74 together at the ends 76. Nuts 80 are used to secure the clamp halves 74 together. The bolts 78 are long enough to extend beyond the base section 18 and allow attachment of the lower pulley plate 70 using nuts 80 on both sides of the lower pulley plate 70. The lower pulley 62 is rotatably attached to the lower pulley plate 70 using a bolt 82 and nut 84. The handle 72 is attached to the lower pulley 62. Two spacers 86 are used in fastening the handle 72 to the lower pulley 62 to allow for clearance of the handle 72 from the lower pulley 62. The clamp half 74 opposite the attachment of the lower pulley 62 includes a threaded hole 88 to receive a monitor mount shaft 90, as shown in FIGS. 14-16. FIG. 16 shows the monitor mount shaft 90 with a monitor mount 92 attached to the monitor mount shaft 90.

Figure 17:
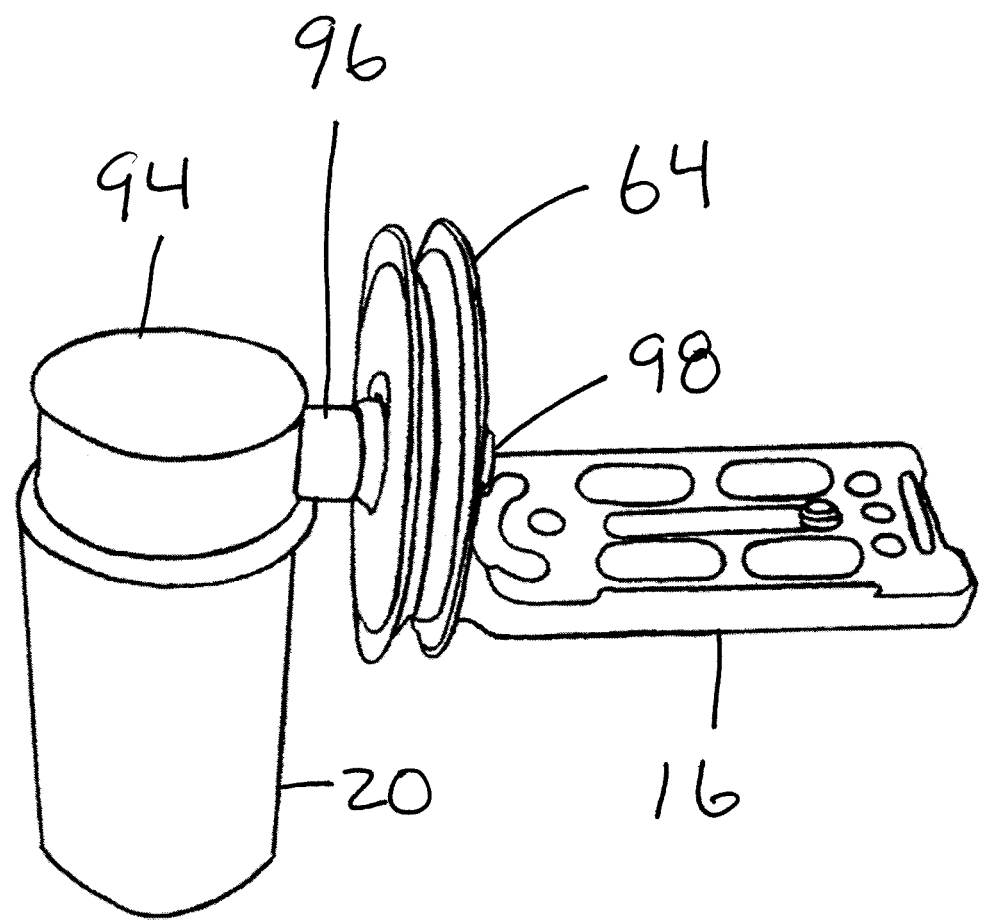
FIG. 17 is a perspective view of an upper pulley according to the present invention.
Figure 18:
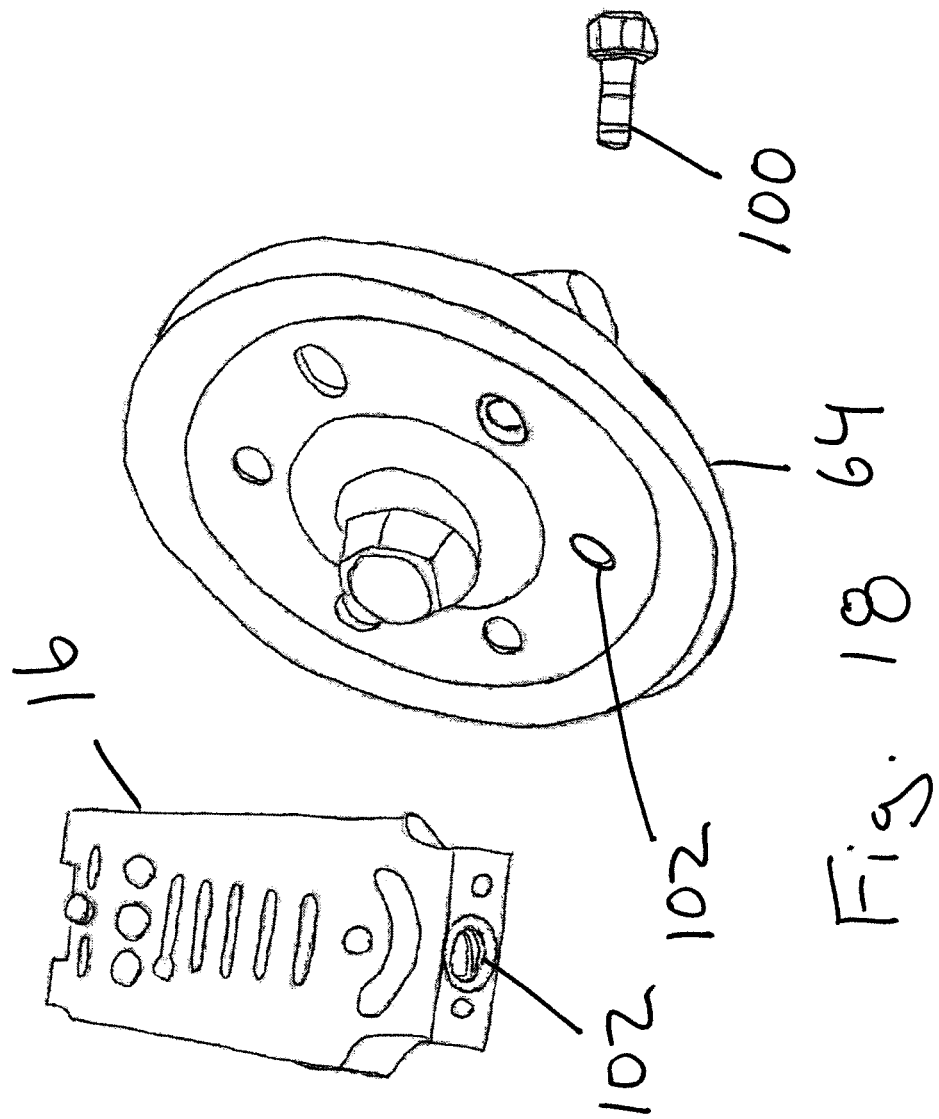
FIG. 18 is a perspective view of an upper pulley according to the present invention.

The upper pulley attachment assembly includes a pole cap 94, bolt spacer 96 and bolt 98, as shown in FIG. 17. The pole cap 94 mounts to the final telescoping section 20 that reaches the highest point. The upper pulley 64 is attached the pole cap 94 using the bolt 98 and spacer 96. Where the bolt 98 threads into pole cap 94 and the spacer 96 is between the pole cap 94 and upper pulley 64. The camera mount 16 is fastened to the upper pulley 64 using a bolt 100 that inserts into a hole 102 in the upper pulley 64 and threads into the camera mount 16, as shown in FIG. 18.

Figure 19:
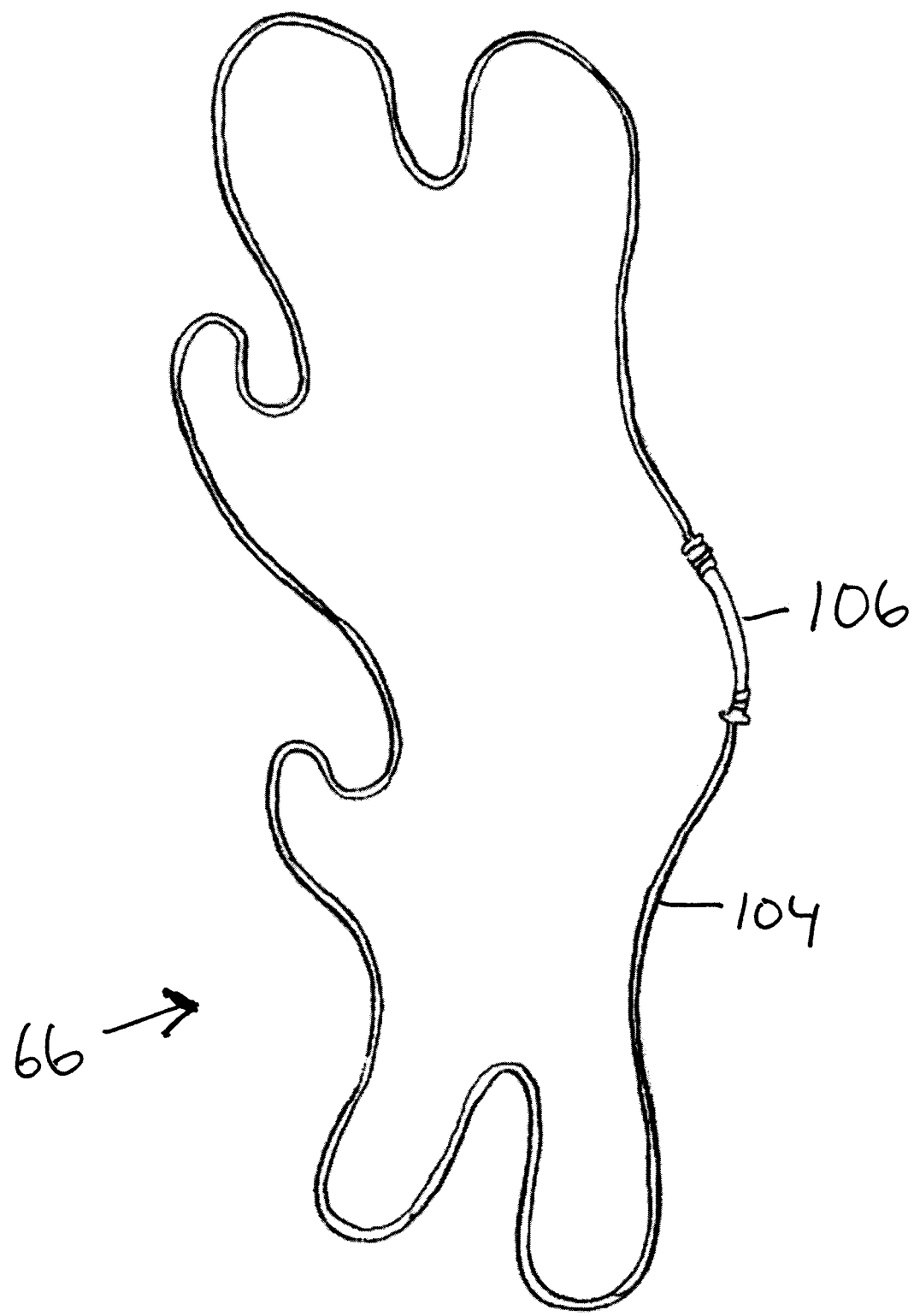
FIG. 19 is a perspective view of an adjustable cable according to the present invention.
Figure 20:
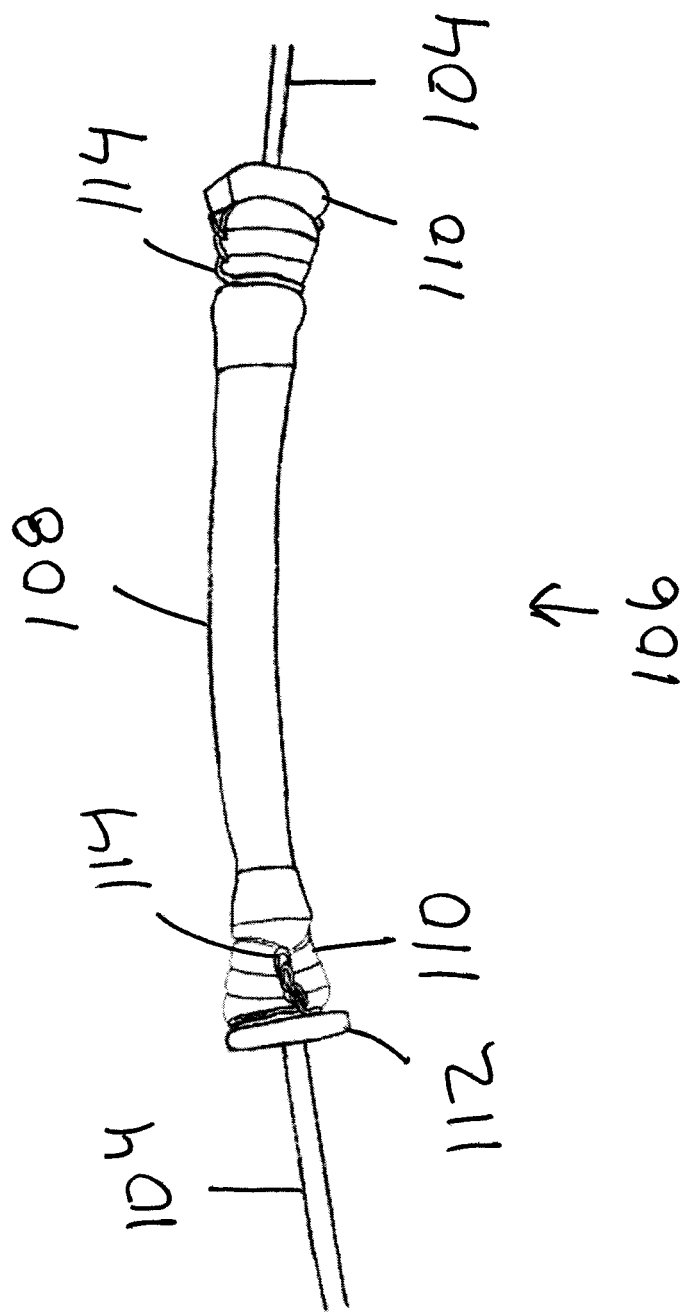
FIG. 20 is a perspective view of an adjustable cable according to the present invention.
Figure 21:
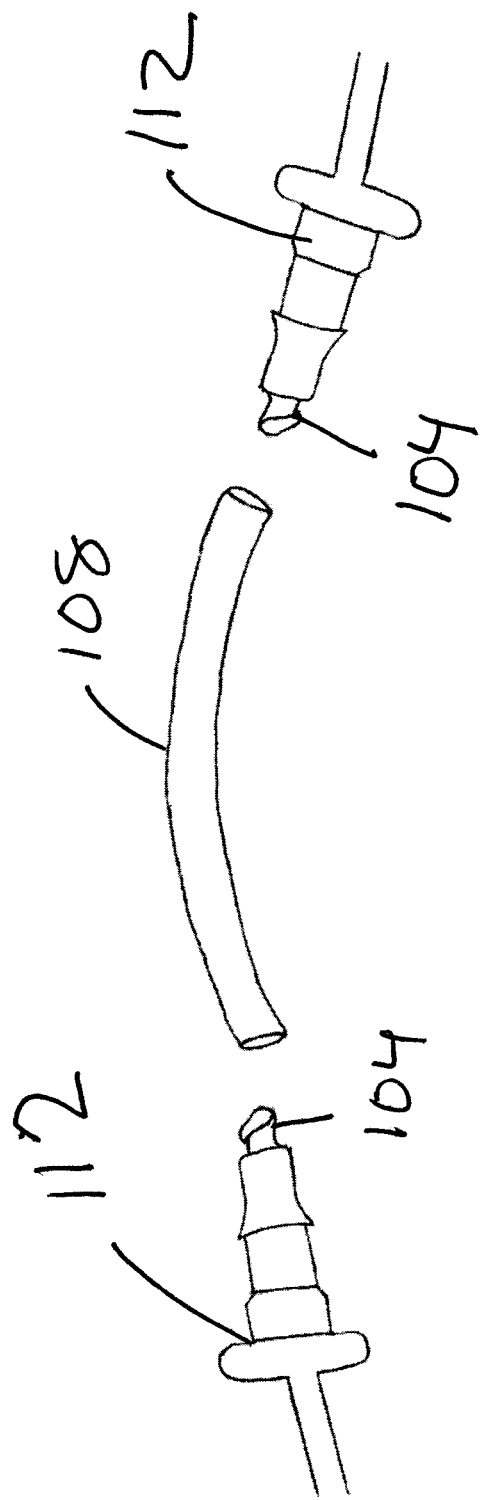
FIG. 21 is a perspective view of an adjustable cable according to the present invention.

FIG. 19 shows the adjustable cable 66. The adjustable cable 66 is a cable 104 with a flexible section 106. The flexible section 106 allows the length of the cable 104 to be changed, when needed for assembly and disassembly of the camera pole assembly 10. FIGS. 20-21 show a close up of the flexible section 106. The main body 108 of the flexible section 106 is of an elastic material to allow the flexible section 106 to be stretched in length when pulled at the ends 110 and retract to its original length when the ends 110 are released. FIG. 21 shows the main body 108 as an elastic tube. The cable 104 has two plug ends 112 which plug into the ends of the main body 108. The plug ends 112 are a plug on the end of cable 104. The plug ends 112 are secured in the main body 108 using a wire tie 114 on the outside of the ends 110 of the main body 104.

Figure 22:
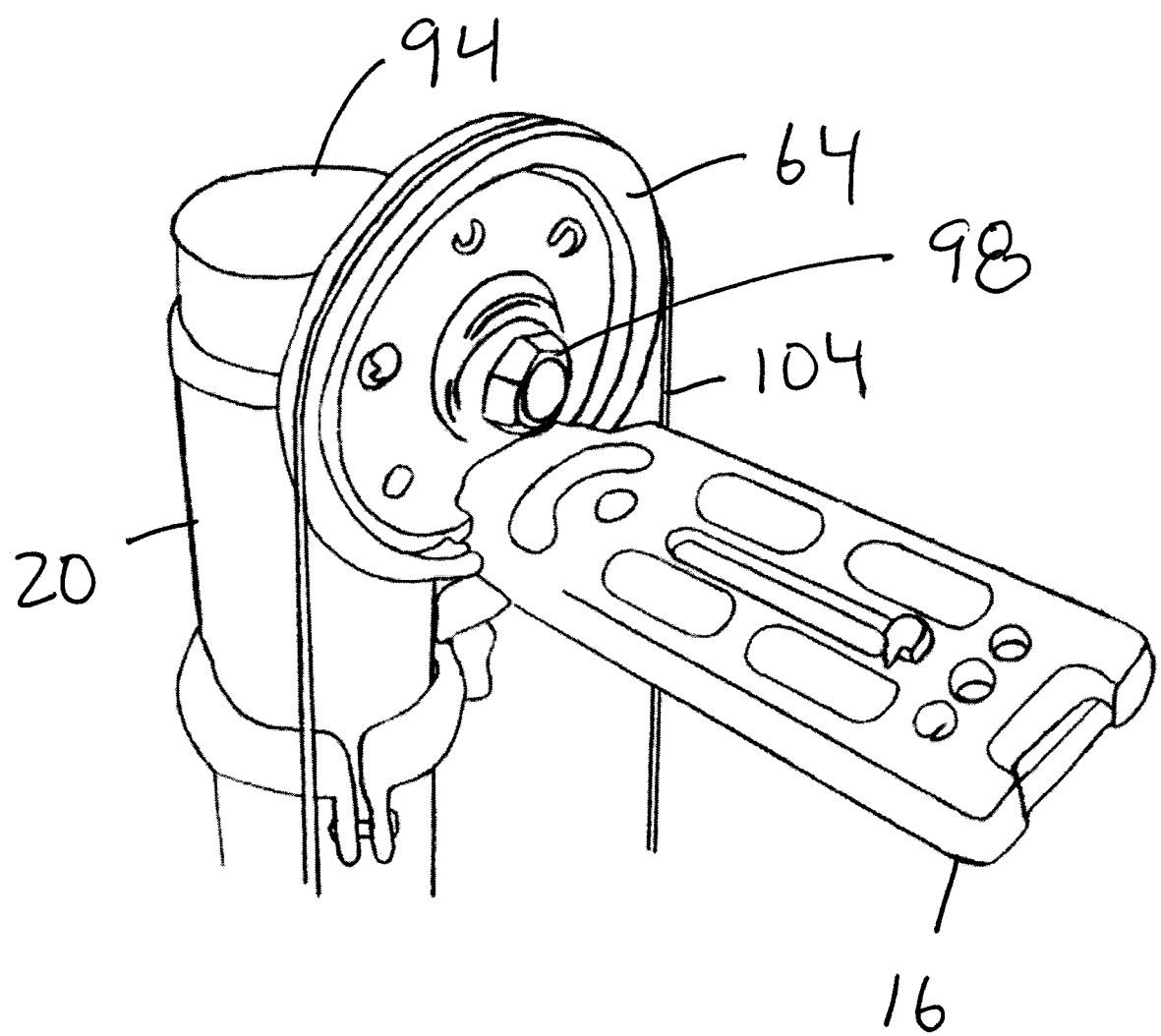
FIG. 22 is a perspective view of an upper pulley cable according to the present invention.
Figure 23:
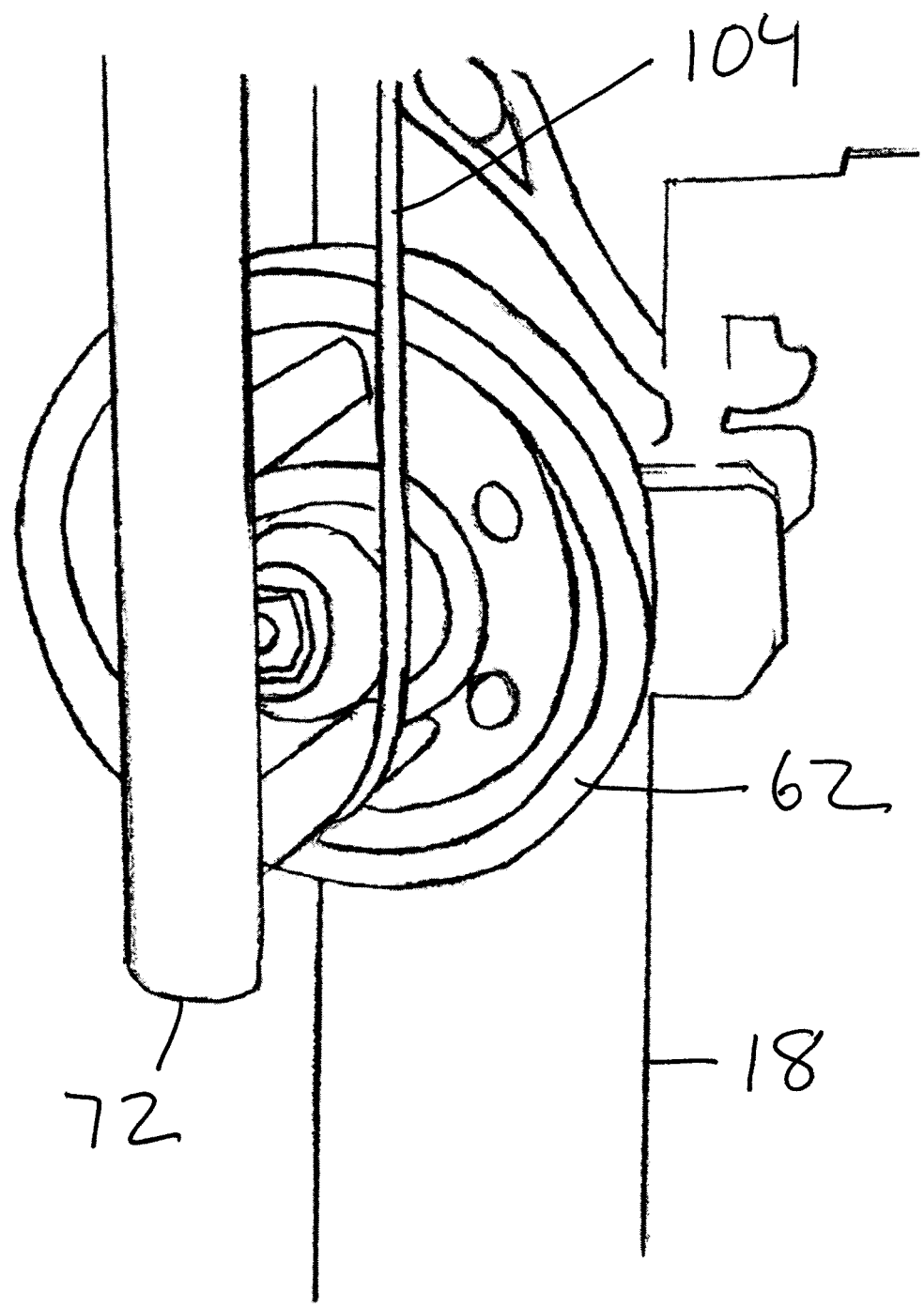
FIG. 23 is a perspective view of a lower pulley according to the present invention.
Figure 24:
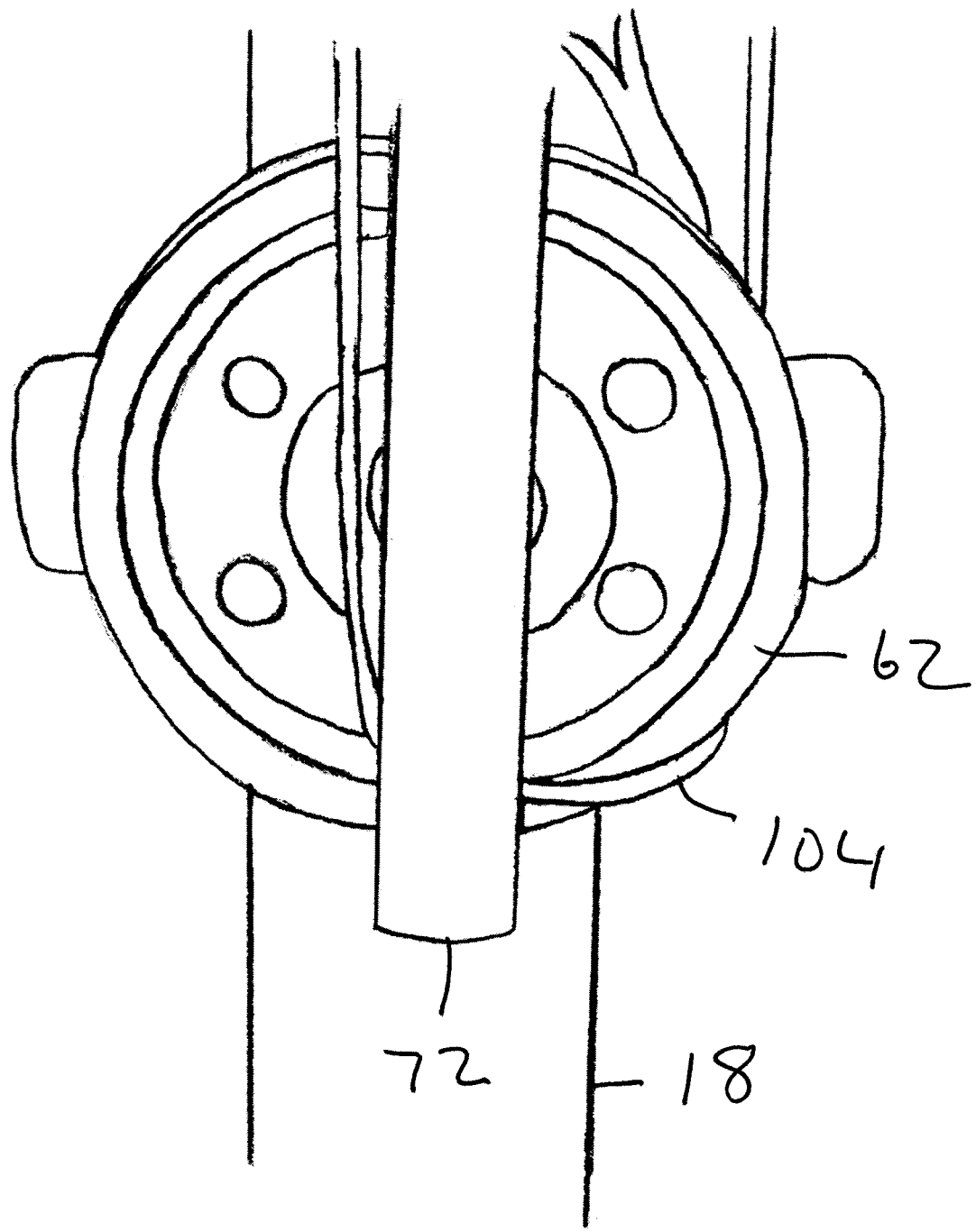
FIG. 24 is a perspective view of a lower pulley according to the present invention.
Figure 25:
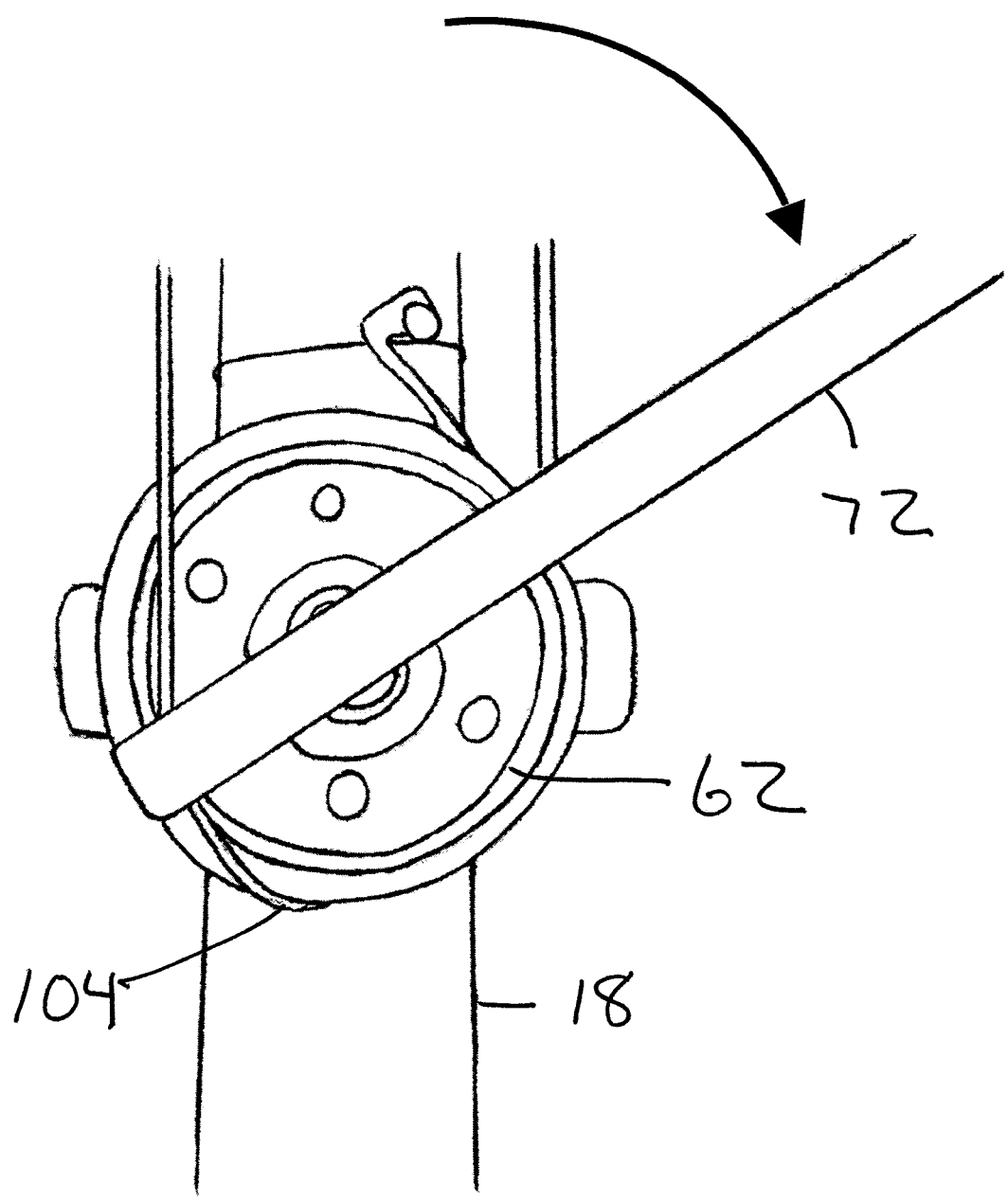
FIG. 25 is a perspective view of a lower pulley according to the present invention.

To assemble the camera pole assembly 10 for use, first the stand 14 must be set up to receive the pole 12. The stand 14 is shown as a tripod with foldable legs 30, where the pointed ends 42 are typically folded toward the center and against each other when stored. To set up the stand 14, the legs 30 are spread apart till the straps 60 are fully extended to center the pole ring 58 under the pole opening 32 of the head 28, as shown in FIGS. 1 and 6. The base section 18 of the pole 12 is inserted into the pole openings 32 of the head 28 and the pole ring 58. The handle 44 of the compression assembly is screwed in until the split ring applies pressure and holds the pole 12. The pole 12 already has the components of the camera control assembly attached to the pole 12, except for the adjustable cable 66. Before the pole 12 is raised, the adjustable cable 66 is drape around the upper pulley 64, as shown in FIG. 22. Then, the final telescoping section 20 is raised first and lock into place using the pin 26, as depicted in FIGS. 3 and 5. Each of the remaining telescoping sections 20 are raised and pined. Before the last telescoping sections 20 are raised, the adjustable cable 66 is placed over the handle 72 attached to the lower pulley 62, as shown in FIG. 23. Also, a camera 116 should be installed on the camera mount 16. Then, the cable 104 is laced over part of the lower pulley 62, as shown in FIG. 24. Finally, the handle 72 of the lower pulley 62 is rotated in the direction of the arrow to apply pressure and force the cable 104 around the entire lower pulley 62, as shown in FIG. 25. The applied pressure by rotating the handle 72 causes the adjustable cable 66 to stretch at the flexible section 106 and allows the adjustable cable 66 to be installed. Installing the adjustable cable 66 in this manner keeps the adjustable cable 66 under tension when installed, where the constant tension of the cable 104 due to the flexible section and friction between the cable 104 and the pulleys 62, 64 causes the cable 104 to rotate the upper pulley 64 when the lower pulley 62 rotates. When a camera 116 is on the camera mount 16, rotation of the handle 72 on the lower pulley 62 causes the camera 116 to be tilted and rotation of the base section 18 in the pole openings 32 causes the camera 116 to be panned. A monitor 118 wired to the camera 116, as shown in FIG. 1, can be mounted to the monitor mount 92 attached to the monitor mount shaft 90, to allow viewing of what is filmed.

Figure 26:
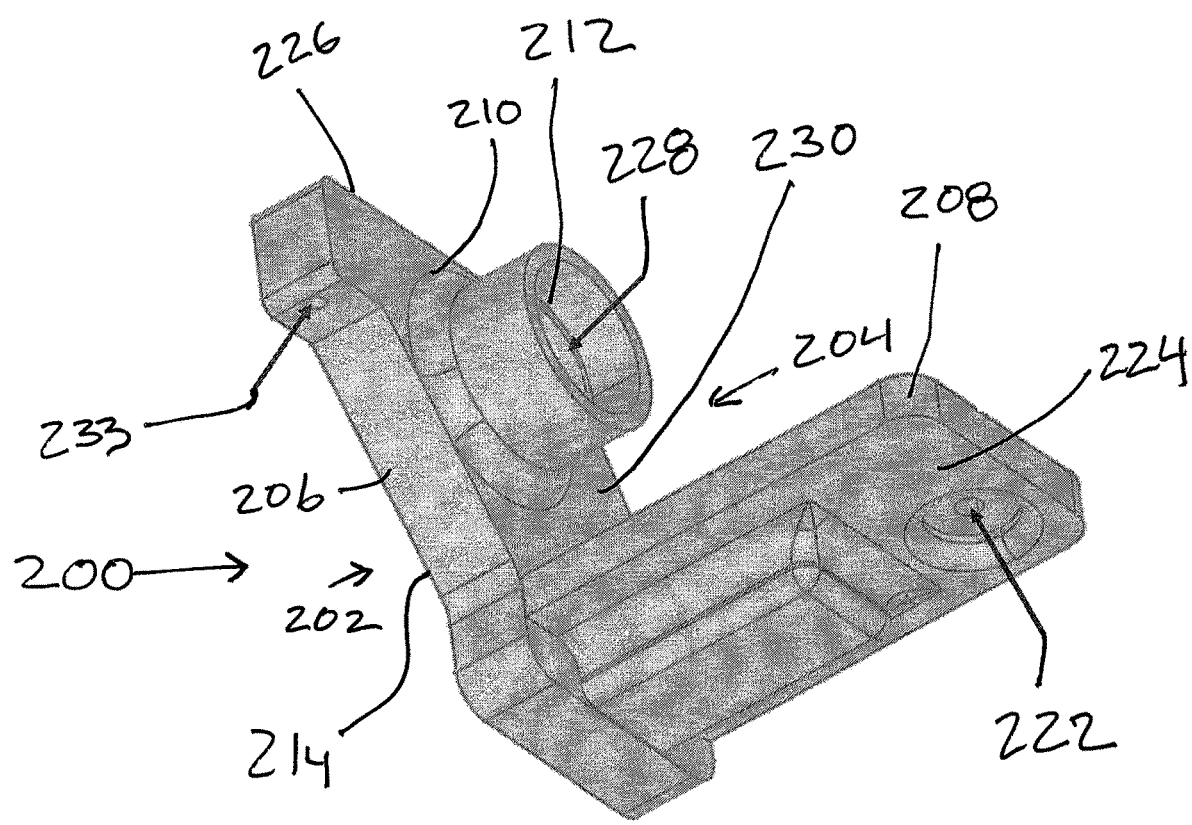
FIG. 26 is a perspective view of a camera mount according to the present invention.
Figure 27:
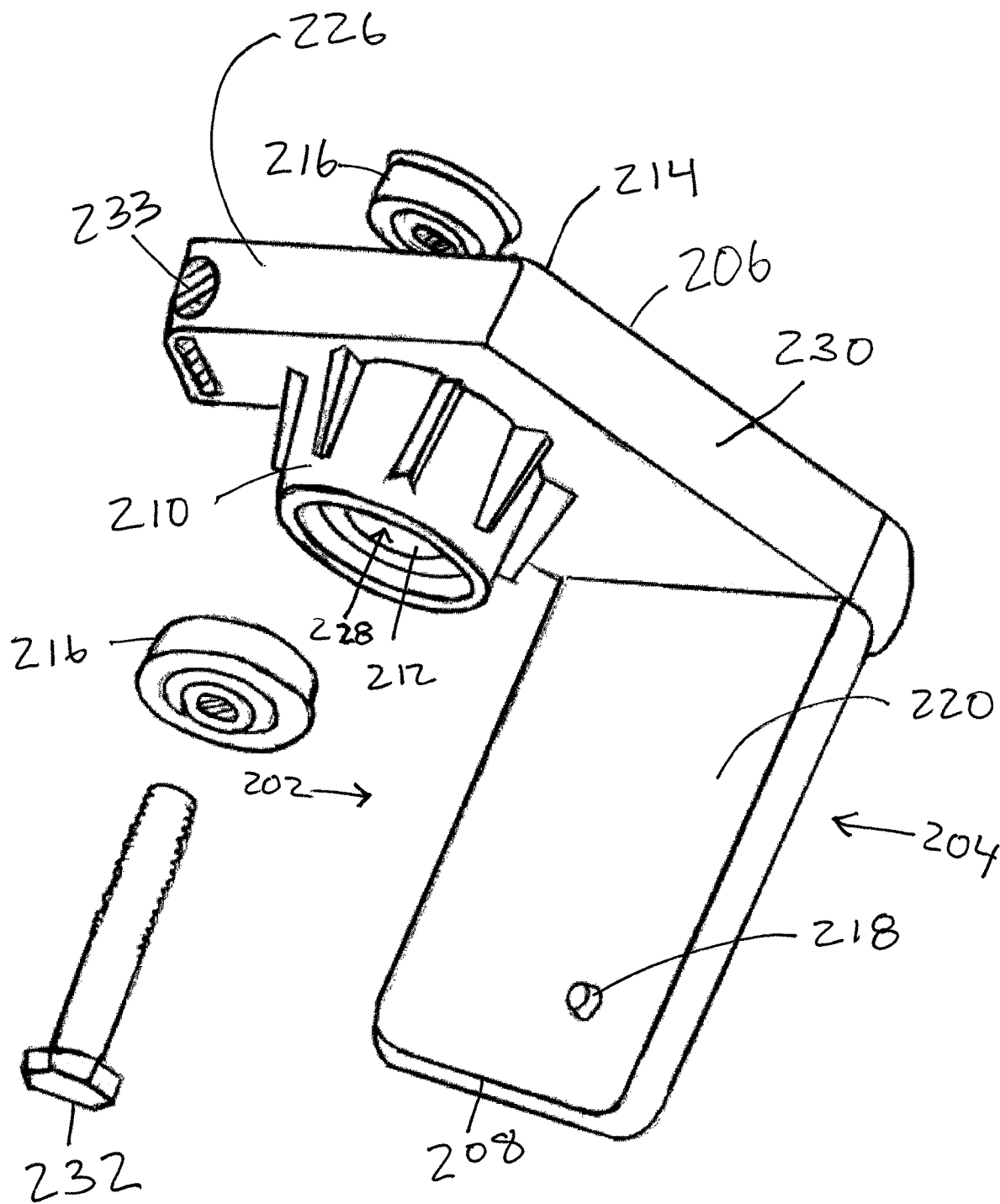
FIG. 27 is a perspective view of a camera mount according to the present invention.
Figure 28:
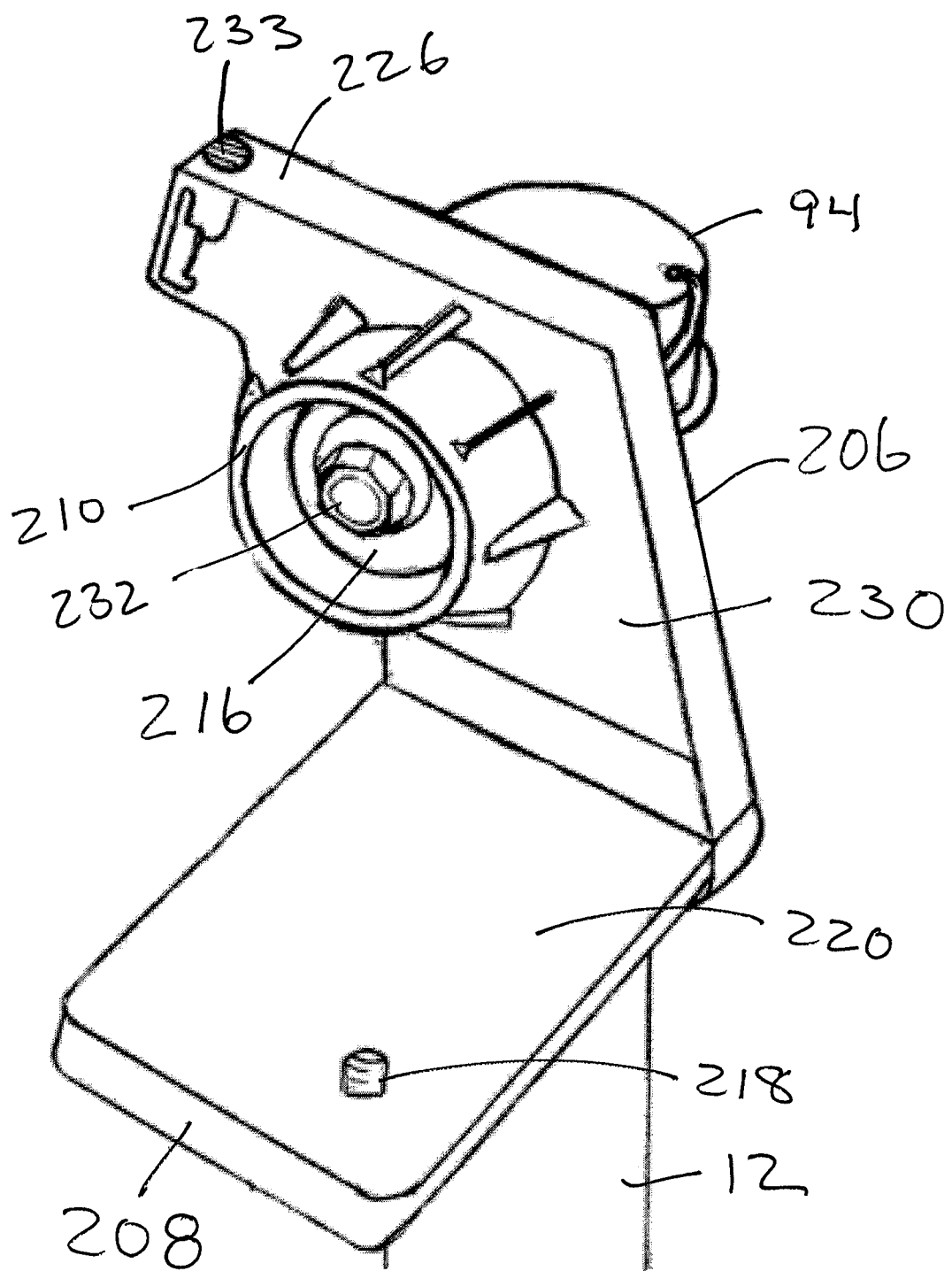
FIG. 28 is a perspective view of a camera mount according to the present invention.
Figure 29:
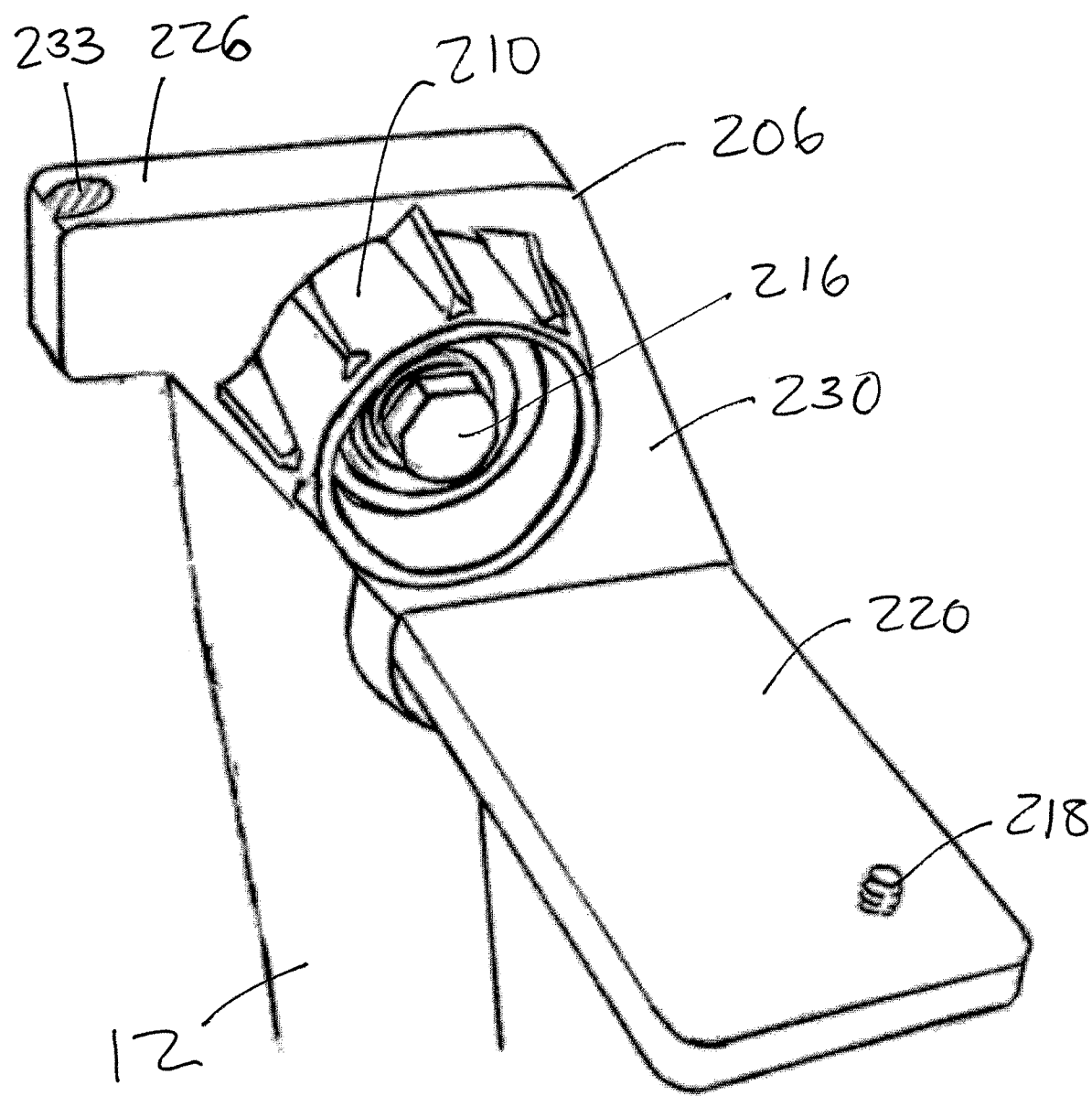
FIG. 29 is a perspective view of a camera mount according to the present invention.

FIGS. 26-34 show a camera tilting mechanism for attaching and moving camera that replaces lower pulley assembly of FIG. 13 and upper pulley attachment assembly of FIG. 17. FIGS. 26-29 show a camera mount 200 to replace the upper pulley assembly. The camera mount 200 has a front 202 and a back 204 and includes a mount arm 206 and a camera support plate 208 extending from the mount arm 206. FIGS. 26-29 show a bearing housing 210 as part of the mount arm 206. The bearing housing 210 includes bearing recesses on both the outside side 212 and inside side 214 of the mount arm 206 to each receive a bearing 216. The camera support plate 208 includes a camera mounting screw 218 to attach a camera to a top surface 220 of the camera support plate 208. FIG. 26 shows a recess 222 to receive the camera mounting screw 218 from a bottom surface 224 of the camera support plate 208. The mount arm 206 is shaped so that a forward upper section 226 extends outward from the axis of rotation 228 of the mount arm 206 and a rear lower section 230 extends downward and rearward from the forward section 226 to meet the camera support plate 208. The shape of the rear lower section 230 proper positions the camera support plate 208 and the weight of the camera to be used. The forward upper section includes a through hole that is a tension cable port 233. FIG. 27 shows a mounting bolt 232 which is inserted into the two bearings 216. The mounting bolt 232 threads into pole cap 94 to roatably attach the camera mount 200 to the pole 12, as shown in FIGS. 28-29.

Figure 30:
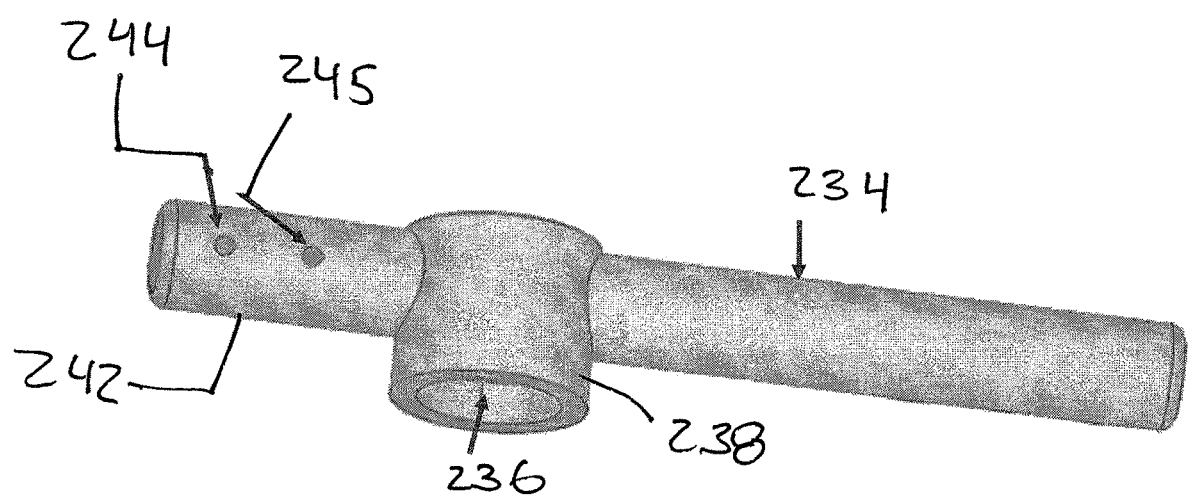
FIG. 30 is a perspective view of a handle assembly according to the present invention.
Figure 31:
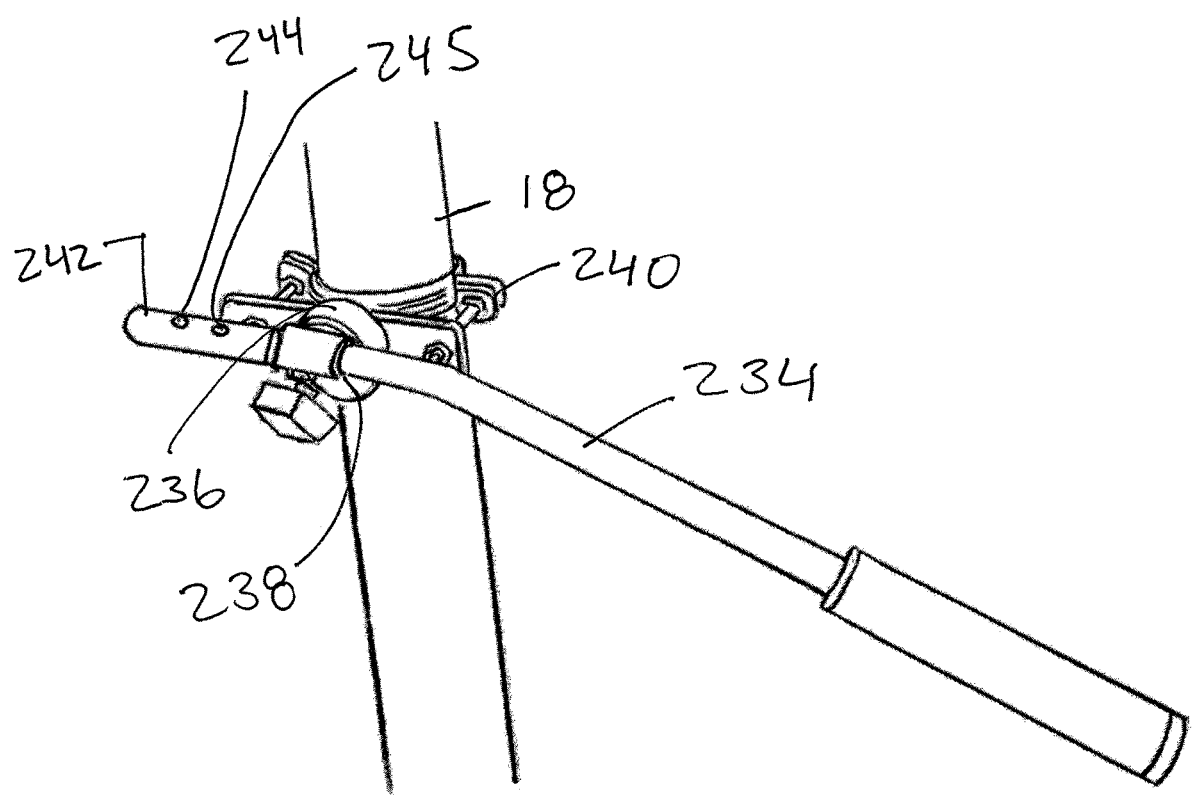
FIG. 31 is a perspective view of a handle assembly according to the present invention.
Figure 32:
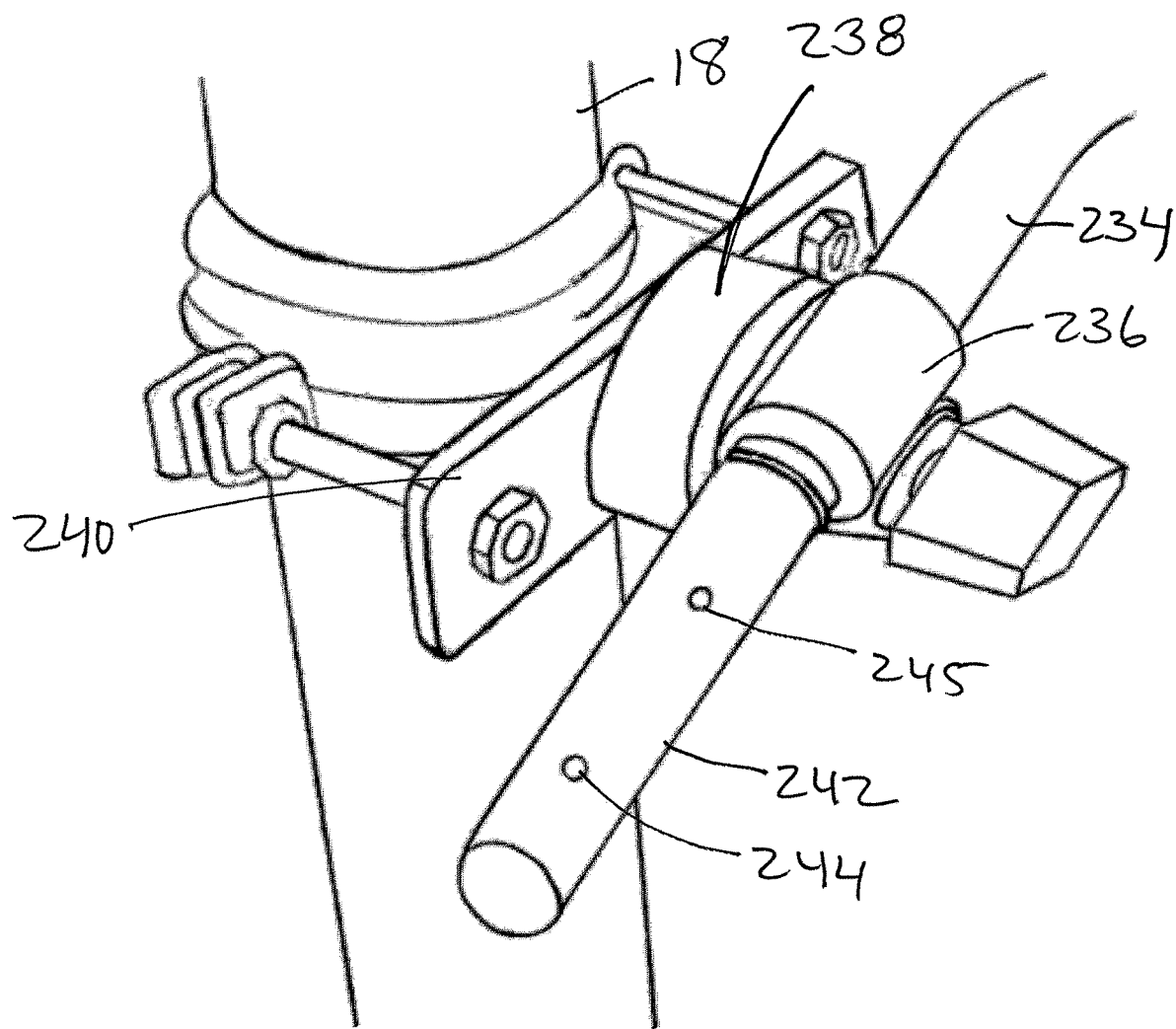
FIG. 32 is a perspective view of a handle assembly according to the present invention.

FIG. 30 shows one type of handle assembly to replace lower pulley assembly and FIGS. 31-32 show another handle assembly to replace lower pulley assembly. Each handle assembly includes a handle 234 attached to handle mount 236. The handle mount 236 includes a bearing housing 238 to receive a bearing and bolt which bolts to a base section handle mount 240 that is connected to the base section 18 of the pole, as shown in FIGS. 31-32. The handle 234 includes a cable attachment section 242 forward of the handle mount 236 that has two cable through holes 244 and 245.

Figure 33:
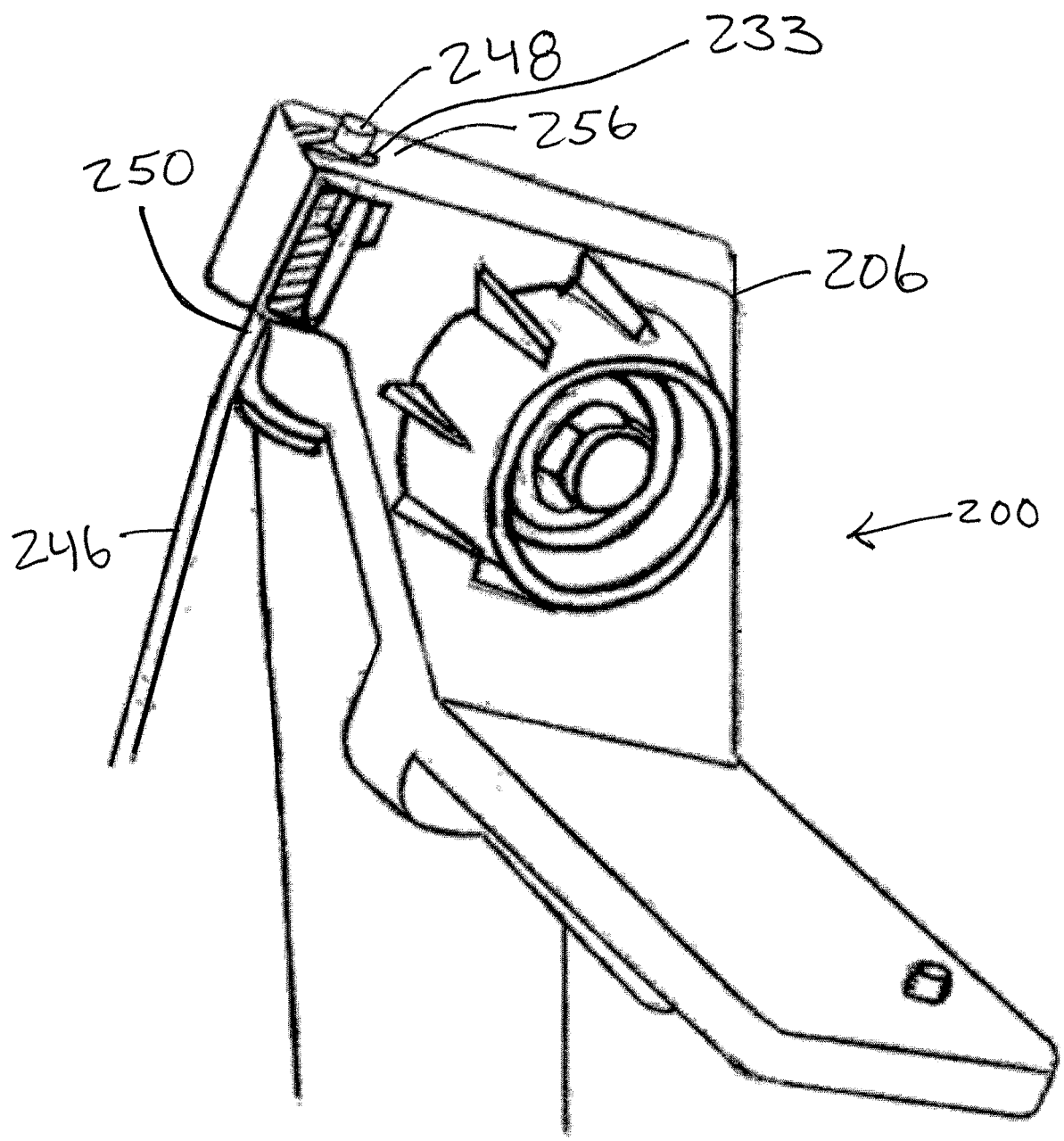
FIG. 33 is a perspective view of a camera mount according to the present invention.
Figure 34:
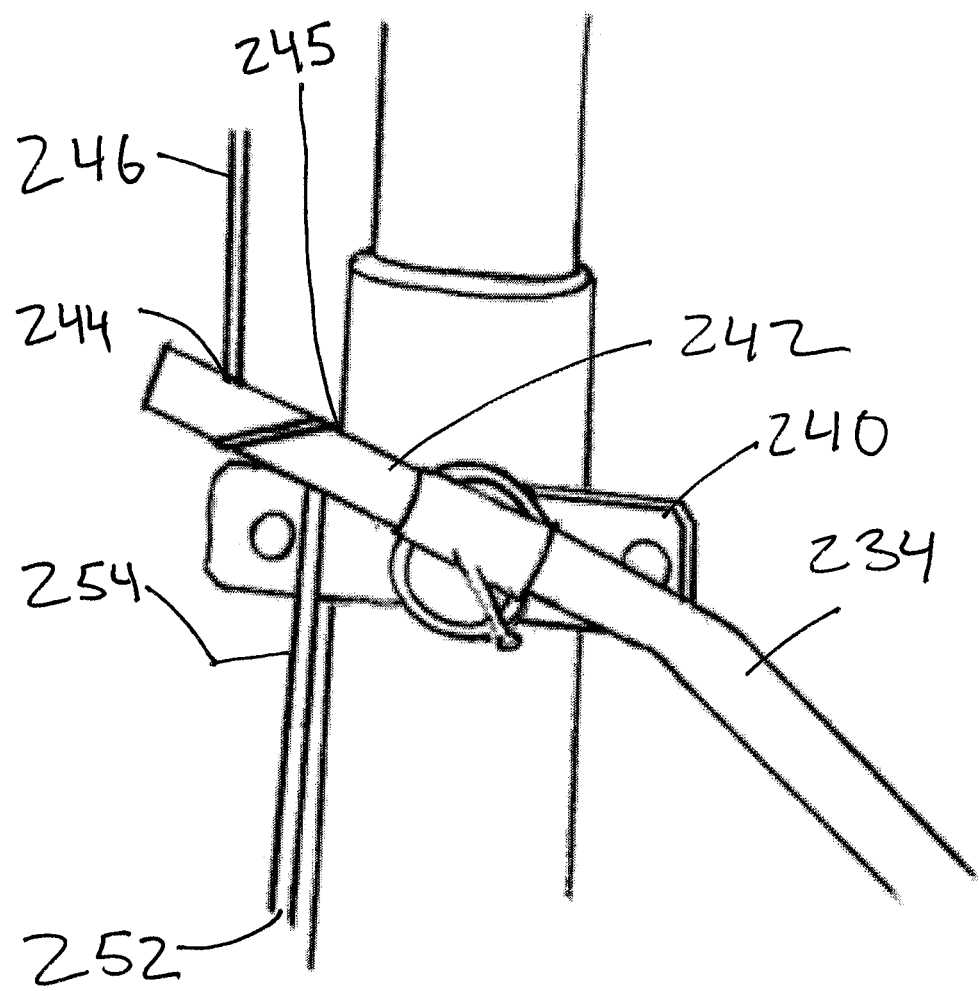
FIG. 34 is a side view of a handle assembly according to the present invention.
Figure 35:
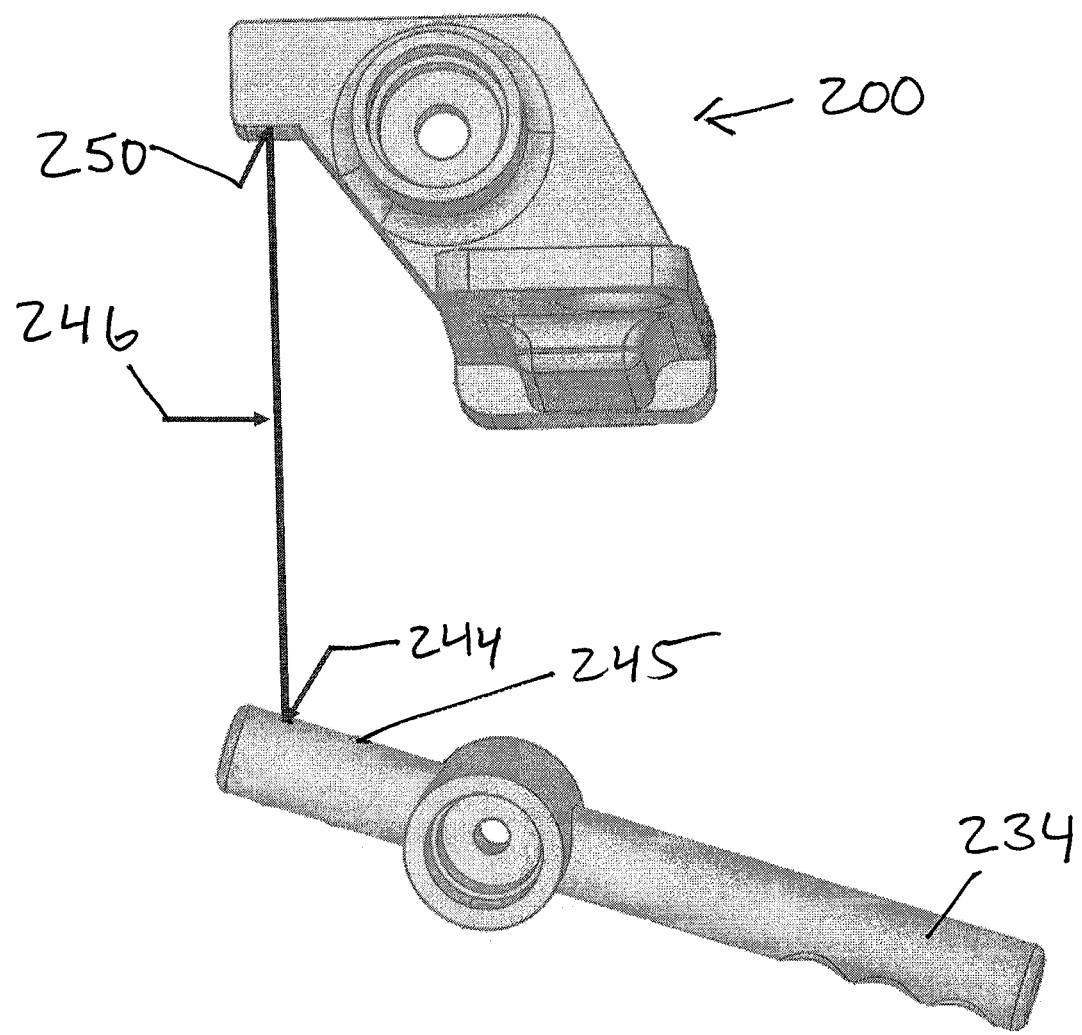
FIG. 35 is a perspective view of a camera mount and handle assembly according to the present invention.

FIGS. 33-35 show a tension cable 246 used to connect the handle assembly to the camera mount 200. The tension cable 246 includes a cable stop 248 on a first end 250 of the tension cable 246 and a free end 252 on a second end 254 of the tension cable 246. The free end 252 of the tension cable 246 is inserted into the tension cable port 233 of the mount arm 206 so that the cable stop 248 engages the top 256 of mount arm 206 and attaches the tension cable 246 to the mount arm 206. FIGS. 34-35 show the second end 254 of the tension cable 246 connected to the cable attachment section 242 of the handle 234. A first hole of the two holes is used a cable length adjustment hole 244 and the second hole of the two holes is used as a cable securement hole 245. The weight of the camera will cause the camera mount 200 to rotate so the front 202 faces upward due to the shape of the rear lower section 203 of the mount arm 206. The pole 12 can be set to any height and the free end 252 of the tension cable 246 is inserted into the cable length adjustment hole 245 and pulled till the camera mount 200 is rotated to the desired level of the camera support plate 208, so the camera is level. This puts tension on the tension cable 246. The free end 252 is then wrapped around the cable attachment section 242 of the handle 234 and inserted into the cable securement hole 245 to secure the tension cable 246 in place by friction. The use of the two holes 244 and 245 allows for easy adjustment to have the proper cable length between the camera mount 200 and the handle assembly based on the height chosen for extending the pole 12. Once the tension cable 246 is secured, rotation of the handle 234 up and down causes rotation of the camera mount 200.

Figure 37:
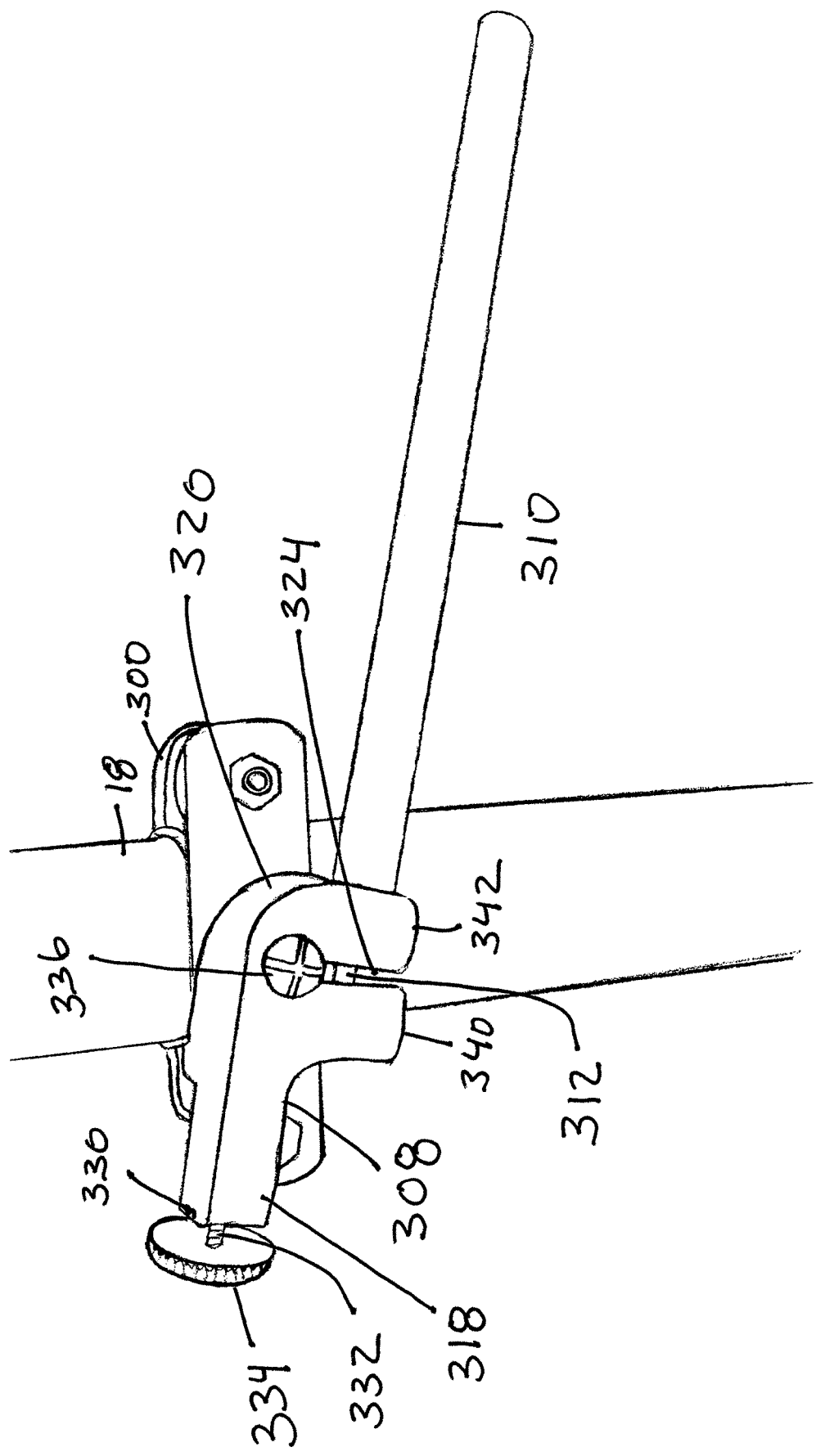
FIG. 37 is a perspective view of a handle assembly according to the present invention.
Figure 38:
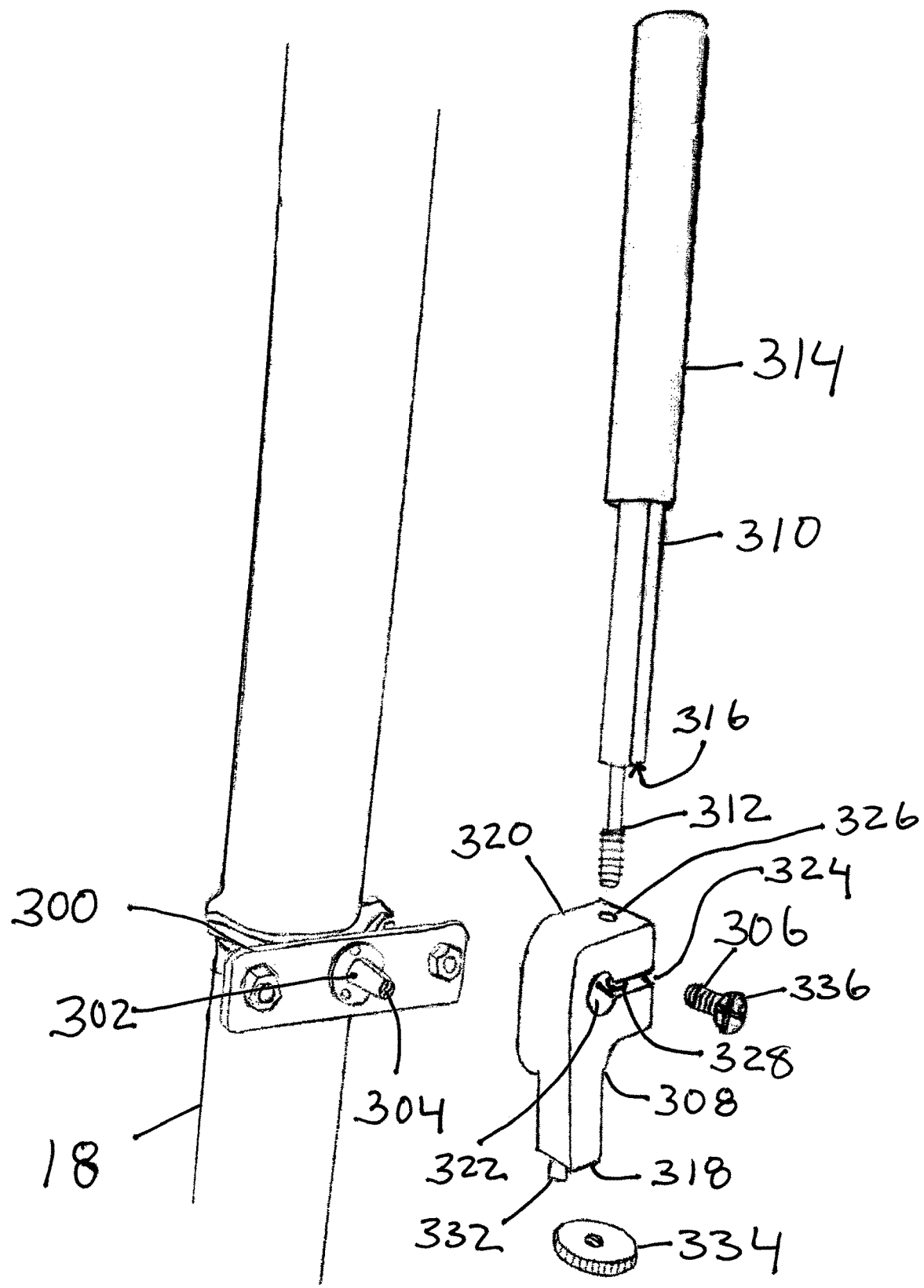
FIG. 38 is a perspective exploded view of a handle assembly according to the present invention.
Figure 39:
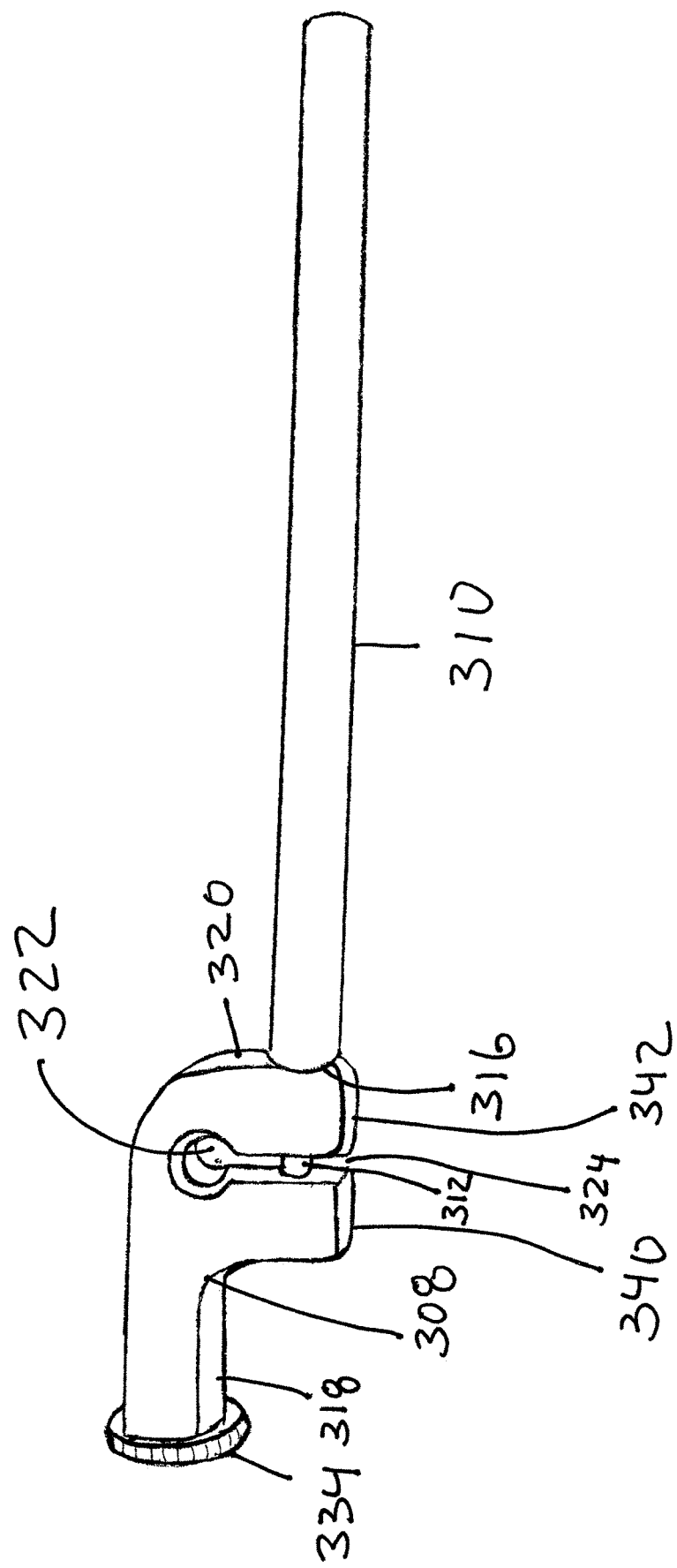
FIG. 39 is a perspective view of a handle assembly according to the present invention.
Figure 40:
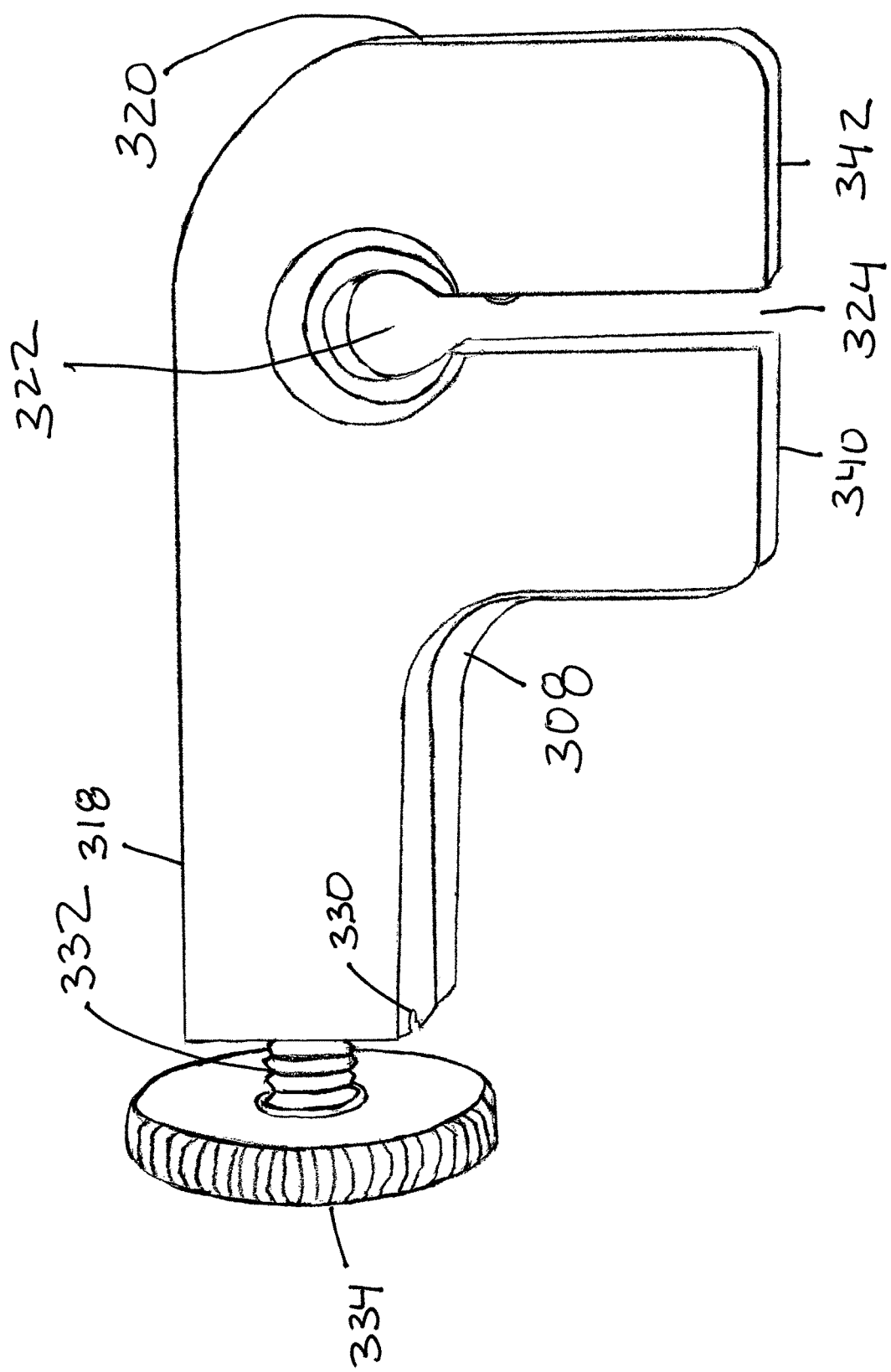
FIG. 40 is a perspective view of a handle block according to the present invention.
Figure 41:
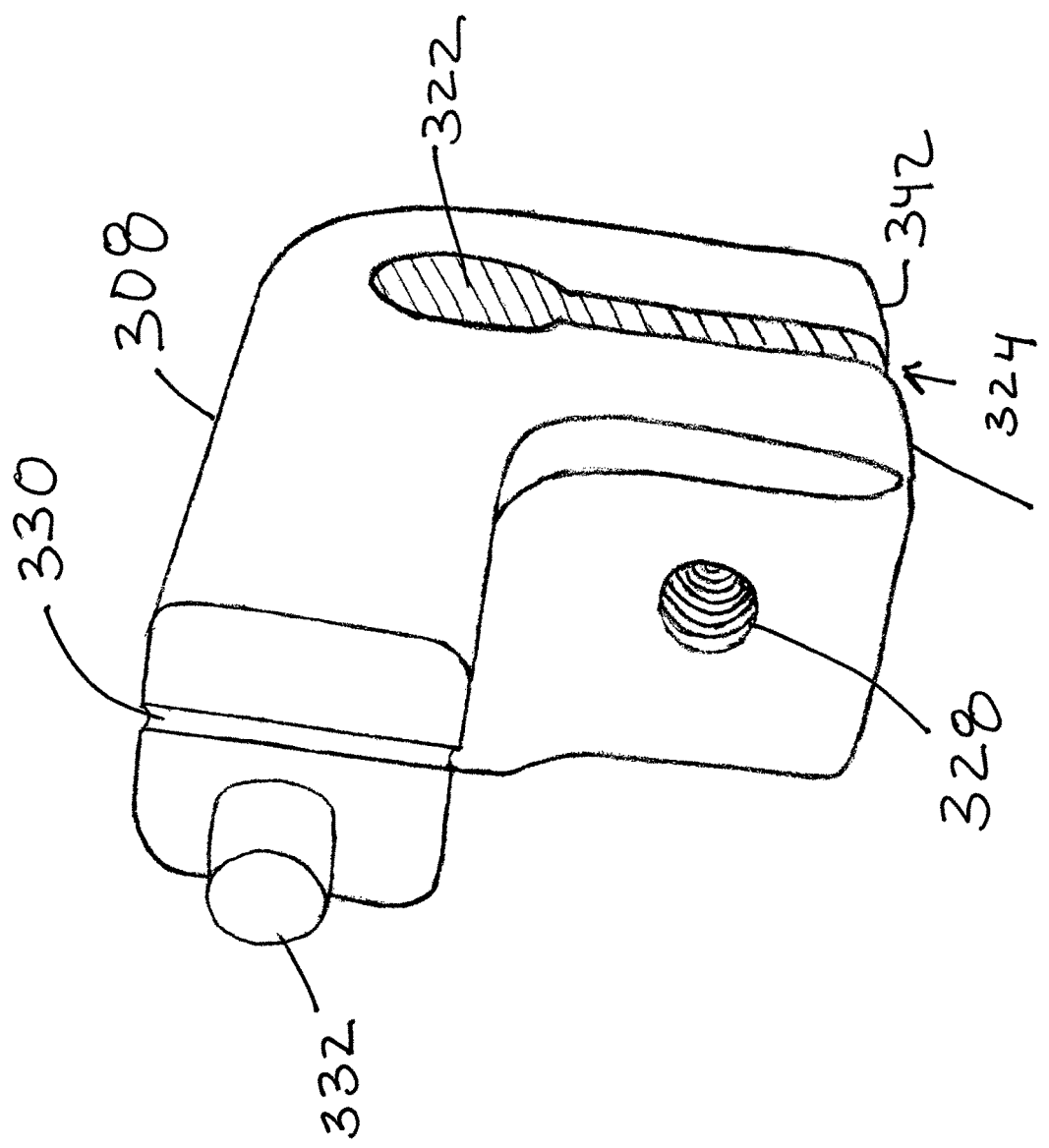
FIG. 41 is a perspective view of a handle block according to the present invention.

FIGS. 36-38 show a handle assembly and base section handle mount, which is another embodiment of a handle assembly to be used with the camera mount 200 of FIGS. 26-29. The handle mount includes a pole mount 300 and handle mount shaft 302. The pole mount 300 is shown attached to a pole 12 in a similar manner as the base section handle mount 240 that is connected to the base section 18 of the pole, as shown in FIGS. 31-32. The handle mount shaft 302 is a cylinder shape that extends from the pole mount 300 to receive the handle assembly, as shown in FIG. 38. The handle mount shaft 302 includes a free end that has an opening leading to a threaded internal channel 304 for receiving a threaded screw 306.

The handle assembly includes a handle block 308 and a handle 310. The handle 310 includes a threaded front shaft 312, handle surface 314 and push surface 316 between the threaded front shaft 312 and handle surface 314. The handle surface 314 is the part of the handle 310 that is held by the user. The handle block 308 has a front 318 and rear 320, as shown in FIGS. 36-41. The handle block 308 includes a handle mount shaft opening 322, a relief slot 324, a handle hole 326, a threaded hole 328, a cable groove 330, a threaded stud 332 and a locking knob 334. The handle mount shaft opening 322 is sized to fit over the handle mount shaft 302. The threaded screw 306 is used to secure the handle block 308 to the handle mount shaft 302. The head 336 of the threaded screw 306 retains the handle block 308 on the handle mount shaft 302, yet allows the handle block 308 to rotate about the handle mount shaft 302. The relief slot 324 is located from the handle mount shaft opening 322 to an outside surface of the handle block 308. The relief slot 324 is through the entire thickness 338 of the handle block 308 and creates a front section 340 below the handle mount shaft opening 322 and a rear section 342 below the handle mount shaft opening 322. The handle hole 326 is a through hole in the rear section 342 to receive and allow passage of the threaded front shaft 312 of the handle 310 to the threaded hole 328 of the front section 340. The threaded hole 328 is a threaded hole in the front section 340 that is aligned with the handle hole 326 in order to receive the threads of the threaded front shaft 312. The cable groove 330 is sized to receive the tension cable 246 near the second end 254 of the tension cable 246. The locking knob 334 threads onto the threaded stud 332 to be tighten against the tension cable 246 in order to lock the tensions cable 246 in place by trapping the tension cable 246 between the cable groove 330 and the locking knob 334. The locking knob 334, threaded stud 332 and cable groove 330 act together as the cable attachment section of the handle assembly. The handle block 308 could also have two through holes (not shown) similar to the adjustment hole 244 and the cable securement hole 245 of handle 234.

The base section handle mount 300 is mounted to the base section 18 of the pole. The handle block 308 is mounted on the handle mount shaft 302 of the base section handle mount 300 using the threaded screw 306 so the handle block 308 can rotate about the handle mount shaft 302. A good choice for material of the handle block 308 is plastic, as plastic acts as a good bearing surface when the handle block 308 interacts with the handle mount shaft 302 during rotation. The threaded front shaft 312 of the handle 310 is inserted into and through the handle hole 326 of the rear section 342 until contact is made with the threaded hole 328 of the front section 340. The handle 310 is rotated so the threads of the threaded front shaft 312 are screwed into the threaded hole 328 of the front section 340 until the push surface 316 of the handle 310 contacts a surface of the rear section 342, so that the handle 310 is attached to the handle block 308, as shown in FIGS. 36-37. The handle 310 is used to rotate the handle block 308 about the handle mount shaft 302 by manipulating the handle surface 314. The handle 310 is then screwed further into the threaded hole 328. As the handle 310 is screwed further, the push surface 316 compresses the front section 340 and the rear section 342 towards each other and about the handle mount shaft 302. The compression of the front section 340 and the rear section 342 about the handle mount shaft 302 act as a friction lock. The compression of the front section 340 and the rear section 342 can be tighten so the weight of the camera will not cause the handle assembly to rotate without aid from the user and tightened to the point where the handle assembly is locked into place and cannot be rotated by the user.

FIG. 36 shows the tension cable 246 connecting the handle assembly to the camera mount 200. The tension cable 246 is connected to the camera mount 200 in the same method as shown in FIGS. 33-35. The second end 254 of the tension cable 246 is connected to the handle assembly by trapping the second end 254 between the locking knob 334 and the cable groove 330. As described before, the weight of the camera will cause the camera mount 200 to rotate so the front 202 faces upward due to the shape of the rear lower section 203 of the mount arm 206. The pole 12 can be set to any height and the second end 254 of the tension cable 246 is pulled in the cable groove 330 before the locking knob 334 is tightened until the camera mount 200 is rotated to the desired level of the camera support plate 208, so the camera is level. This puts tension on the tension cable 246 between the camera mount 200 and the handle assembly. The tension cable is held until the tension cable can be locked into place at the handle assembly by tightening the locking knob 334 against the tension cable 246. Once the tension cable 246 is secured at the handle block 308, rotation of the handle 310 up and down causes rotation of the camera mount 200.

While different embodiment of the invention have been described in detail herein, it will be appreciated by those skilled in the art that various modification and alternatives to embodiments could be developed in light of the overall teachings of the disclosure. Accordingly, the particular arrangements are illustrated only and are not limiting as to the scope of the invention that is to be given the full breadth of any and all equivalents thereof.

We claim:

1. A camera pole for elevating and controlling a camera, comprising:
    a pole, said pole having a base section and a least one telescoping section which extends from said base section, wherein a final telescoping section is a top section that is highest and said base section is closest to ground level;
    a stand to receive said pole and support said pole in a vertical position;
    a camera control assembly comprising:
    a tension cable with a first end and a second end;
    a camera mount rotatably mounted to said pole at an axis of rotation, said camera mount including a mount arm and a camera support plate extending from said mount arm, said camera support plate adapted to receive the camera, said mount arm including an attachment point for said first end of said tension cable;
    a handle mount, said handle mount attached to said base section of said pole, said handle mount further including a handle mount shaft and a fastener, said handle mount shaft extending outward from said handle mount to a free end and said fastener attaches to said free end of said handle mount shaft; and
    a handle assembly, said handle assembly including a handle block and a handle;
    said handle block rotatably mounted to said handle mount shaft, said handle mounted to said handle block so that said handle can be used to adjust required force needed to rotate said handle block about said handle mount shaft and said handle mounting including a cable attachment section for attachment of said second end of said tension cable.

2. The camera pole of claim 1, wherein said handle includes a threaded front shaft, handle surface and push surface between said threaded front shaft and handle surface; and wherein said handle block includes a handle mount shaft opening, a relief slot, a handle hole, and a threaded hole; said handle mount shaft opening sized to fit over said handle mount shaft, said relief slot located from said handle mount shaft opening to an outside surface of said handle block, said relief slot is through entire thickness of said handle block to create a front section below said handle mount shaft opening and a rear section below said handle mount shaft opening, said handle hole is a through hole in said rear section to receive and allow passage of said threaded front shaft of said handle, said threaded hole is a threaded hole in said front section that is aligned with said handle hole in order to receive threads of said threaded front shaft, said push surface of said handle used to compress said front section and said rear section together in order to compress said handle block about said handle mount shaft.

3. The camera pole of claim 1, wherein said cable attachment section for attachment of said second end of said tension cable includes a cable groove, threaded stud and locking knob, said cable groove located on said handle block to receive said second end of said tension cable, said threaded stud and locking knob mounted to said handle block so that said locking knob can trap said tension cable in said cable groove.

4. The camera pole of claim 2, wherein said cable attachment section for attachment of said second end of said tension cable includes a cable groove, threaded stud and locking knob, said cable groove located on said handle block to receive said second end of said tension cable, said threaded stud and locking knob mounted to said handle block so that said locking knob can trap said tension cable in said cable groove.

5. The camera pole of claim 1, wherein said camera mount is rotatably mounted to said pole at an axis of rotation, said camera mount having a front and a back, said camera mount including a mount arm and a camera support plate extending from said mount arm, said camera support plate adapted to receive the camera, said mount arm having forward upper section extending forward from said axis of rotation and a rear lower section extending downward and rearward from said forward section to meet said camera support plate, said forward upper section including a through hole that is a tension cable port to receive said second end of said tension cable.

6. The camera pole of claim 1, further including a bearing housing as part of said mount arm, said bearing housing including bearing recesses on both an outside side and inside side of said mount arm to each receive a bearing.

7. The camera pole of claim 1, further including a bearing housing as part of said mount arm, said bearing housing including bearing recesses on both an outside side and inside side of said mount arm to each receive a bearing; and further including a mounting bolt which is inserted into said two bearings and threads into said pole to rotatably attach said camera mount to said pole.

8. The camera pole of claim 1, further including a pin for each of said least one telescoping section to prevent each of said least one telescoping section from descending when extended; wherein each of said least one telescoping section has a top and bottom, wherein each of said least one telescoping section has a through hole to receive said pin.

9. The camera pole of claim 1, wherein said stand includes a head with a pole opening to receive said base section of said pole, wherein said head includes a compression lock assembly to secure said base section of said pole with tension to hold said pole while allowing said pole to rotate within said pole opening.

10. The camera pole of claim 9, further including a pole stabilizer, said pole stabilizer including a pole ring with straps, said straps connected between said pole ring and legs of said stand, and said pole ring including a pole opening to receive said base section of said pole after said base section is inserted into said pole opening of said head.

11. The camera pole of claim 9, wherein said compression lock assembly is positioned internally about said pole opening, wherein said compression lock assembly includes a handle, hole in said head to receive said handle and compression ring, wherein said compression ring is a split ring that can be pressured against said base section of said pole by said handle.

12. A camera pole for elevating and controlling a camera, comprising:
a pole, said pole having a base section and a least one telescoping section which extends from said base section, wherein a final telescoping section is a top section that is highest and said base section is closest to ground level;
a stand to receive said pole and support said pole in a vertical position;
a camera control assembly comprising:
a tension cable with a free end and a stop end, said stop end including a stop;
a camera mount rotatably mounted to said pole at an axis of rotation, said camera mount having a front on one side of said axis of rotation and a back on an other side of said axis of rotation that is opposite said front such that said front and rear rotate about said axis of rotation, said camera mount including a mount arm and a camera support plate extending from said mount arm, said camera support plate adapted to receive the camera, said mount arm having forward upper section extending forward from said axis of rotation at said front and a rear lower section extending downward and rearward from said forward section on said other side of said axis of rotation to meet said camera support plate such that said camera support plate is adapted to use the weight of the camera to rotate said camera mount one direction about said axis of rotation, said forward upper section including a through hole that is a tension cable port to receive said free end of said tension cable so that pulling of said tension cable against said forward upper section causes rotation of the camera mount in a direction opposite of the weight of the camera; and
a handle assembly, said handle assembly including a handle and a handle mount, said handle mount rotatably attached to said base section of said pole, said handle attached to said handle mount, said handle assembly including cable attachment section forward of said handle mount for attachment of said tension cable near said second end of said tension cable.

13. The camera pole of claim 12, wherein said cable attachment section includes adjustable fastener for attachment of said tension cable so that the length of cable between said camera mount and said handle assembly can be adjusted at said handle assembly.

14. The camera pole of claim 12, wherein said cable attachment section for attachment of said tension cable includes a cable groove to receive said tension cable near said second end, threaded stud and locking knob, said threaded stud and locking knob mounted to said cable attachment section so that said locking knob can trap said tension cable in said cable groove.

15. The camera pole of claim 12, further including a bearing housing as part of said mount arm, said bearing housing including bearing recesses on both an outside side and inside side of said mount arm to each receive a bearing.

16. The camera pole of claim 12, further including a bearing housing as part of said mount arm, said bearing housing including bearing recesses on both an outside side and inside side of said mount arm to each receive a bearing; and further including a mounting bolt which is inserted into said two bearings and threads into said pole to rotatably attach said camera mount to said pole.

17. The camera pole of claim 12, further including a pin for each of said least one telescoping section to prevent each of said least one telescoping section from descending when extended; wherein each of said least one telescoping section has a top and bottom, wherein each of said least one telescoping section has a through hole to receive said pin.

18. The camera pole of claim 12, wherein said stand includes a head with a pole opening to receive said base section of said pole, wherein said head includes a compression lock assembly to secure said base section of said pole with tension to hold said pole while allowing said pole to rotate within said pole opening.

19. The camera pole of claim 18, further including a pole stabilizer, said pole stabilizer including a pole ring with straps, said straps connected between said pole ring and legs of said stand, and said pole ring including a pole opening to receive said base section of said pole after said base section is inserted into said pole opening of said head.

20. The camera pole of claim 18, wherein said compression lock assembly is positioned internally about said pole opening, wherein said compression lock assembly includes a handle, hole in said head to receive said handle and compression ring, wherein said compression ring is a split ring that can be pressured against said base section of said pole by said handle.

\* \* \* \* \*